US011257280B1

(12) United States Patent
Pedrotti et al.

(10) Patent No.: US 11,257,280 B1
(45) Date of Patent: Feb. 22, 2022

(54) ELEMENT-BASED SWITCHING OF RAY CASTING RULES

(71) Applicant: Facebook Technologies, LLC, Menlo Park, CA (US)

(72) Inventors: Owen Pedrotti, Seattle, WA (US); Gayan Ediriweera, Seattle, WA (US); Brandon Furtwangler, Issaquah, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/886,494

(22) Filed: May 28, 2020

(51) Int. Cl.
*G06T 15/06* (2011.01)
*G06F 3/01* (2006.01)
*G06F 3/0481* (2013.01)
*G06F 3/04815* (2022.01)

(52) U.S. Cl.
CPC .............. *G06T 15/06* (2013.01); *G06F 3/017* (2013.01); *G06F 3/04815* (2013.01)

(58) Field of Classification Search
CPC combination set(s) only.
See application file for complete search history.

(56) References Cited

U.S. PATENT DOCUMENTS

| | | | |
|---|---|---|---|
| 6,842,175 B1 | 1/2005 | Schmalstieg et al. | |
| 7,701,439 B2 | 4/2010 | Hillis et al. | |
| 8,493,383 B1 * | 7/2013 | Cook | G06T 15/06 345/419 |
| 8,558,759 B1 | 10/2013 | Prada Gomez et al. | |
| 8,831,794 B2 | 9/2014 | Persaud et al. | |
| 8,902,227 B2 | 12/2014 | Harrison | |
| 8,947,351 B1 | 2/2015 | Noble | |
| 9,052,161 B2 | 6/2015 | Page | |
| 9,117,274 B2 | 8/2015 | Liao et al. | |
| 9,159,140 B2 | 10/2015 | Hoof et al. | |

(Continued)

FOREIGN PATENT DOCUMENTS

WO 2018235371 12/2018

OTHER PUBLICATIONS

Hincapie-Ramos, J.D. et al. "GyroWand: IMU-based raycasting for augmented reality head-mounted displays." Proceedings of the 3rd ACM Symposium on Spatial User Interaction, Aug. 2015, pp. 89-98.

(Continued)

*Primary Examiner* — Motilewa Good Johnson
(74) *Attorney, Agent, or Firm* — Potomac Law Group, PLLC

(57) ABSTRACT

Elements in an artificial reality environment (e.g., objects or volumes) can be assigned different ray casting rules. In response to detecting a corresponding trigger, such as the user entering the volume or interacting with the object, the ray casting rules associated with that element can be implemented. Implementing the ray casting rules can control aspects of the ray such as the ray's shape, size, effects of the ray, where a ray originates, whether the ray is directed along a particular plane, or how rays are controlled. In some cases, an artificial reality system can cast multiple rays at the same time, which are controlled by the same feature of a user. Using priority rules (e.g., weighting factors, hierarchies, filters, etc.), the artificial reality system can determine which ray is primary, allowing the user to use the primary ray to interact with elements.

19 Claims, 15 Drawing Sheets

(56) References Cited

U.S. PATENT DOCUMENTS

| | | |
|---|---|---|
| 9,292,089 B1 | 3/2016 | Sadek |
| 9,342,230 B2 | 5/2016 | Bastien et al. |
| 9,412,010 B2 | 8/2016 | Kawaguchi et al. |
| 9,477,368 B1 | 10/2016 | Filip et al. |
| 9,526,983 B2 | 12/2016 | Lin |
| 9,811,721 B2 | 11/2017 | Tang et al. |
| 9,817,472 B2 | 11/2017 | Lee et al. |
| 9,818,231 B2 | 11/2017 | Coffey et al. |
| 9,821,224 B2 | 11/2017 | Latta et al. |
| 9,886,096 B2 | 2/2018 | Kang et al. |
| 9,940,750 B2 | 4/2018 | Dillavou et al. |
| 10,019,131 B2 | 7/2018 | Welker et al. |
| 10,026,231 B1 | 7/2018 | Gribetz et al. |
| 10,043,279 B1 | 8/2018 | Eshet |
| 10,048,760 B2 | 8/2018 | Abercrombie |
| 10,067,636 B2 | 9/2018 | Palmaro |
| 10,102,676 B2 | 10/2018 | Yajima et al. |
| 10,133,342 B2 | 11/2018 | Mittal et al. |
| 10,163,001 B2 | 12/2018 | Kim et al. |
| 10,168,873 B1 | 1/2019 | Holz et al. |
| 10,181,218 B1 | 1/2019 | Goetzinger, Jr. et al. |
| 10,220,303 B1 | 3/2019 | Schmidt et al. |
| 10,235,807 B2 | 3/2019 | Thomas et al. |
| 10,248,284 B2 | 4/2019 | Itani et al. |
| 10,303,259 B2 | 5/2019 | Brunner et al. |
| 10,325,184 B2 | 6/2019 | Brunner et al. |
| 10,339,721 B1 | 7/2019 | Dascola et al. |
| 10,423,241 B1 | 9/2019 | Pham et al. |
| 10,451,875 B2 | 10/2019 | Sutherland et al. |
| 10,473,935 B1 | 11/2019 | Gribetz et al. |
| 10,481,755 B1 | 11/2019 | Ngo et al. |
| 10,521,944 B2 | 12/2019 | Sareen et al. |
| 10,558,048 B2 | 2/2020 | Fukuda et al. |
| 10,592,067 B2 | 3/2020 | Merdan et al. |
| 10,617,956 B2 | 4/2020 | Black et al. |
| 10,649,212 B2 | 5/2020 | Burns et al. |
| 10,657,694 B2 | 5/2020 | Sharma et al. |
| 10,726,266 B2 | 7/2020 | Sharma et al. |
| 10,802,600 B1 | 10/2020 | Ravasz et al. |
| 10,818,071 B1 * | 10/2020 | Hoppe .................. G06T 7/55 |
| 10,818,088 B2 | 10/2020 | Jones et al. |
| 10,824,247 B1 * | 11/2020 | Henrikson ............ G06F 3/0346 |
| 10,890,653 B2 | 1/2021 | Giusti et al. |
| 10,922,894 B2 | 2/2021 | Sculli et al. |
| 10,970,936 B2 | 4/2021 | Osborn et al. |
| 11,030,237 B2 | 6/2021 | Itani et al. |
| 11,077,360 B2 | 8/2021 | Ohashi |
| 2004/0224670 A1 | 11/2004 | Hull et al. |
| 2007/0003915 A1 | 1/2007 | Templeman |
| 2008/0089587 A1 | 4/2008 | Kim et al. |
| 2010/0306716 A1 | 12/2010 | Perez |
| 2011/0009241 A1 | 1/2011 | Lane et al. |
| 2011/0032257 A1 * | 2/2011 | Peterson ................ G06T 1/20 |
| | | 345/420 |
| 2011/0154266 A1 | 6/2011 | Friend et al. |
| 2011/0254846 A1 | 10/2011 | Lee et al. |
| 2011/0267265 A1 | 11/2011 | Stinson |
| 2011/0310220 A1 | 12/2011 | McEldowney |
| 2012/0069168 A1 | 3/2012 | Huang et al. |
| 2012/0143358 A1 | 6/2012 | Adams et al. |
| 2012/0157198 A1 | 6/2012 | Latta et al. |
| 2012/0188279 A1 | 7/2012 | Demaine |
| 2012/0206345 A1 | 8/2012 | Langridge |
| 2012/0256967 A1 | 10/2012 | Baldwin et al. |
| 2012/0275686 A1 | 11/2012 | Wilson et al. |
| 2012/0293544 A1 | 11/2012 | Miyamoto et al. |
| 2013/0002551 A1 | 1/2013 | Imoto et al. |
| 2013/0022843 A1 | 1/2013 | Tohda |
| 2013/0026220 A1 | 1/2013 | Whelihan |
| 2013/0042296 A1 | 2/2013 | Hastings et al. |
| 2013/0063345 A1 | 3/2013 | Maeda |
| 2013/0125066 A1 | 5/2013 | Klein et al. |
| 2013/0147793 A1 | 6/2013 | Jeon et al. |
| 2013/0211843 A1 | 8/2013 | Clarkson |
| 2013/0265220 A1 | 10/2013 | Fleischmann et al. |
| 2014/0125598 A1 | 5/2014 | Cheng et al. |
| 2014/0168217 A1 | 6/2014 | Kim et al. |
| 2014/0201666 A1 | 7/2014 | Bedikian et al. |
| 2014/0236996 A1 | 8/2014 | Masuko et al. |
| 2014/0357366 A1 | 12/2014 | Koganezawa et al. |
| 2014/0375691 A1 | 12/2014 | Kasahara |
| 2015/0009238 A1 | 1/2015 | Kudalkar |
| 2015/0035746 A1 | 2/2015 | Cockburn et al. |
| 2015/0054742 A1 | 2/2015 | Imoto et al. |
| 2015/0061998 A1 | 3/2015 | Yang et al. |
| 2015/0062160 A1 | 3/2015 | Sakamoto et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0260474 A1 | 9/2015 | Rublowsky et al. |
| 2015/0261659 A1 | 9/2015 | Bader et al. |
| 2016/0027212 A1 | 1/2016 | Da Veiga et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0171771 A1 | 6/2016 | Pedrotti et al. |
| 2016/0210784 A1 | 7/2016 | Ramsby et al. |
| 2016/0378291 A1 | 12/2016 | Pokrzywka |
| 2017/0060230 A1 | 3/2017 | Faaborg et al. |
| 2017/0060319 A1 | 3/2017 | Seo et al. |
| 2017/0109936 A1 | 4/2017 | Powderly et al. |
| 2017/0123487 A1 | 5/2017 | Hazra et al. |
| 2017/0139478 A1 | 5/2017 | Jeon et al. |
| 2017/0192513 A1 | 7/2017 | Karmon et al. |
| 2017/0203213 A1 | 7/2017 | Stafford |
| 2017/0205892 A1 | 7/2017 | Petrovskaya et al. |
| 2017/0236320 A1 | 8/2017 | Gribetz et al. |
| 2017/0237789 A1 | 8/2017 | Harner et al. |
| 2017/0243401 A1 | 8/2017 | Tanaka et al. |
| 2017/0262063 A1 | 9/2017 | Blenessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0364198 A1 | 12/2017 | Yoganandan et al. |
| 2017/0372499 A1 | 12/2017 | Lalonde |
| 2018/0005443 A1 | 1/2018 | Poulos et al. |
| 2018/0024623 A1 | 1/2018 | Faaborg et al. |
| 2018/0059901 A1 | 3/2018 | Gullicksen |
| 2018/0095635 A1 | 4/2018 | Valdivia et al. |
| 2018/0107278 A1 | 4/2018 | Goel et al. |
| 2018/0113599 A1 | 4/2018 | Yin |
| 2018/0144556 A1 | 5/2018 | Champion et al. |
| 2018/0224928 A1 | 8/2018 | Ross et al. |
| 2018/0307303 A1 | 10/2018 | Powderly et al. |
| 2018/0322701 A1 | 11/2018 | Pahud et al. |
| 2018/0335925 A1 | 11/2018 | Hsiao et al. |
| 2018/0349690 A1 | 12/2018 | Rhee et al. |
| 2018/0357780 A1 | 12/2018 | Young et al. |
| 2019/0033989 A1 | 1/2019 | Wang et al. |
| 2019/0050062 A1 | 2/2019 | Chen et al. |
| 2019/0094981 A1 | 3/2019 | Bradski et al. |
| 2019/0097981 A1 | 3/2019 | Koyun et al. |
| 2019/0102941 A1 | 4/2019 | Khan et al. |
| 2019/0107894 A1 | 4/2019 | Hebbalaguppe et al. |
| 2019/0130655 A1 | 5/2019 | Gupta et al. |
| 2019/0188895 A1 | 6/2019 | Miller, IV et al. |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0310757 A1 | 10/2019 | Lee et al. |
| 2019/0355272 A1 | 11/2019 | Nusbaum et al. |
| 2019/0362557 A1 | 11/2019 | Lacey et al. |
| 2019/0362562 A1 | 11/2019 | Benson |
| 2019/0369391 A1 | 12/2019 | Cordesses et al. |
| 2019/0377416 A1 | 12/2019 | Alexander |
| 2020/0001461 A1 | 1/2020 | Cappello et al. |
| 2020/0033957 A1 | 1/2020 | Bieglmayer |
| 2020/0064908 A1 | 2/2020 | Boucher |
| 2020/0082629 A1 | 3/2020 | Jones et al. |

(56) References Cited

U.S. PATENT DOCUMENTS

| | | | |
|---|---|---|---|
| 2020/0097077 | A1 | 3/2020 | Nguyen et al. |
| 2020/0097091 | A1 | 3/2020 | Chou et al. |
| 2020/0103521 | A1 | 4/2020 | Chiarella et al. |
| 2020/0134895 | A1 | 4/2020 | Pollard et al. |
| 2020/0143598 | A1 | 5/2020 | Riordan |
| 2020/0218423 | A1 | 7/2020 | Ohashi |
| 2020/0225736 | A1 | 7/2020 | Schwarz et al. |
| 2020/0225758 | A1 | 7/2020 | Tang et al. |
| 2020/0225830 | A1 | 7/2020 | Tang et al. |
| 2020/0226814 | A1* | 7/2020 | Tang .................. G06T 19/003 |
| 2020/0241646 | A1 | 7/2020 | Hebbalaguppe et al. |
| 2020/0249746 | A1 | 8/2020 | Gkaintatzis |
| 2020/0272231 | A1 | 8/2020 | Klein et al. |
| 2020/0379576 | A1 | 12/2020 | Chen et al. |
| 2021/0012113 | A1 | 1/2021 | Petill et al. |

OTHER PUBLICATIONS

Schweigert, R. et al. "EyePointing: A gaze-based selection technique." Proceedings of Mensch and Computer, Sep. 8, 2019, pp. 719-723.

Mayer, S. et al. "The effect of offset correction and cursor on mid-air pointing in real and virtual environments." Proceedings of the 2018 CHI Conference on Human Factors in Computing Systems, Apr. 2018, pp. 1-13.

Olwal, A. et al. "The Flexible Pointer: An Interaction Technique for Selection in Augmented and Virtual Reality," Proceedings of ACM Symposium on User Interface Software and Technology (UIST), pp. 81-82, publication date Nov. 5, 2003.

Renner, P. et al. "Ray Casting", <www.techfak.uni-bielefeld. de/~tpfeiffe/lehre/VirtualReality/interaction/ray_casting.html> [accessed Apr. 7, 2020], 2 pages.

"Unity Gets Toolkit for Common AR/VR interactions" <youtu.be/ZPhv4qmT9EQ> [accessed Apr. 7, 2020]. Unity XR Interaction Toolkit Preview Dec. 19, 2019.

Qiao, Xiuquan et al. "Web AR: A Promising Future for Mobile Augmented Reality—State of the Art, Challenges, and Insights," Apr. 2019, vol. 107, No. 4 IEEE, pp. 651-666.

Srinivasa, Ramanujam R. et al. "Augmented Reality Adaptive Web Content," IEEE Annual Consumer Communications & Networking Conference (CCNC) 2016, pp. 1-4, date unknown.

Katz, Neil et al. "Extending Web Browsers with a Unity 3D-Based Virtual Worlds Viewer," 2011 IEEE Computer Society, pp. 15-21, published Sep. 11, 2011.

International Search Report and Written Opinion, PCT Patent Application PCT/US2020/052976, dated Dec. 12, 2020, 10 pages.

International Search Report and Written Opinion, PCT Patent Application PCT/US2020/051763, dated Feb. 3, 2021, 11 pages.

International Search Report and Written Opinion for International Application No. PCT/US2020/058648, dated Feb. 23, 2021, 12 Pages.

International Search Report and Written Opinion for International ApplicationNo. PCT/US2021/038826, dated Oct. 19, 2021, 12 pages.

* cited by examiner

US 11,257,280 B1

ELEMENT-BASED SWITCHING OF RAY CASTING RULES

TECHNICAL FIELD

The present disclosure is directed to dynamic selection of ray casting rules in a three-dimensional (3D) environment.

BACKGROUND

In an artificial reality environment, some or all of the objects a user sees and interacts with are "virtual objects," i.e., representations of objects generated by a computing system that appear in an environment. Virtual objects in an artificial reality environment can be presented to the user by a head-mounted display, a mobile device, a projection system, or another computing system. Often, users can interact with virtual objects using controllers and/or gestures. In some cases, the artificial reality system can track user interactions with "real objects" that exist independent of the artificial reality system controlling the artificial reality environment. For example, a user can select a real object and add a virtual overlay to change the object's color or some other way the object is presented to the user, cause it to affect other virtual objects, etc. As used herein, unless otherwise specified, an "object" can be a real or virtual object.

Some 3D systems allow users to interact with objects using projections, or "rays," which in many cases are lines cast out from a user's hand. Various systems have defined different types of rays, such as straight rays, curved rays, or rays that emanate from different body parts or other user-controlled elements. While each ray casting system has its own benefits, each also has drawbacks. Thus, in certain circumstances, each of the various existing ray casting systems are cumbersome, imprecise, and/or inoperable.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
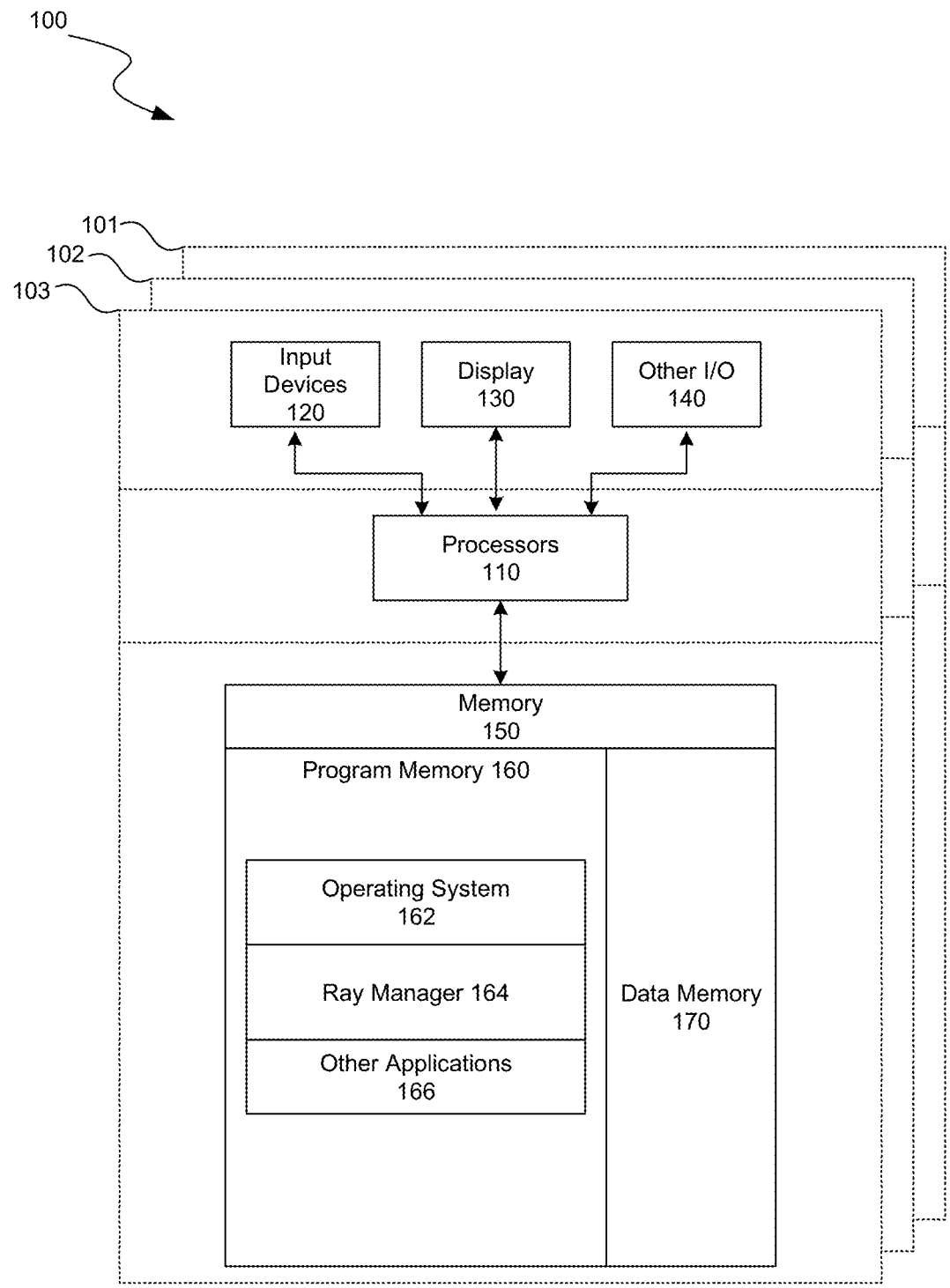
FIG. 1 is a block diagram illustrating an overview of devices on which some implementations of the present technology can operate.

Aspects of the present disclosure are directed to managing ray casting in a 3D environment by allowing controllers of artificial environment elements to assign different ray casting rules to that element, setting ray casting rules for elements in response to triggers, and managing multiple simultaneous rays. Rules for casting a ray can control properties of the ray such as the ray's shape (e.g., line, curve, cone, pyramid, cylinder, sphere, or combinations of shapes); size (e.g., diameter and/or length); effects of the ray (e.g., effect of the ray hitting an object, whether ray passes through objects, automated actions triggered by a ray, or delay time before a ray that dwells on an object selects that object); where a ray originates and at what angle (e.g., whether the ray is anchored from one point and directed from another point; whether the ray originates from a user hand, eye, or controller; or whether the ray is angled in relation to a particular plane or its angle is user controlled); or how ray(s) are controlled (e.g., whether the ray is based on a single hand or controller or if any two-hand control modifications are applied).

Elements in a 3D environment can be assigned different rules by a controller of that element. Controllers can include, for example, an application that created the object or that has been assigned by an artificial reality system control over the volume. In various implementations, the artificial reality system can provide an interface to aspects of the rays that the controller can set. In some implementations, the rules can be organized into ray casting rule sets defining interaction modalities and the controller can assign one of these pre-defined rule sets to an element. For example, one rule set can specify a "downward" ray casting modality where a ray is cast straight down from a user's hand. As another specific example, another rule set can specify that, within an associated volume, cast rays are eighteen inches long from a user's hand and are anchored at the user's eye.

Any combination of non-conflicting rules can be added to a pre-defined rule set, which then can be assigned to different elements or shared for use by others. For example, in some cases, defined rule sets can be applied to elements in a declaratory manner such as by setting the rule set name when initializing the element. In some implementations, rule sets can be automatically assigned to elements, e.g., based on a mapping of element types to rule sets or based on a determination of how users typically use the element (or elements identified as similar) and a match between that use-case and ray casting rules. Further, a controller can assign different rule sets to the same element to be applied in different contexts or with different triggers causing their activation, e.g., depending on characteristics of the user, identified relationship to other elements, distances between the user and the element, etc.

In some implementations, the controller can also specify an affordance that can be associated with an element to indicate how rays will interact with that element. For example, a visual affordance of a downward arrow can be added to a volume indicating that, within that volume, the downward ray casting rules will be applied. In some implementations, affordances can be associated with the predefined rule sets, providing consistency across how elements signal what ray casting rules are mapped to them.

Once an application creates an object or is assigned a volume to write into, and the application assigns ray casting rules to that element, the element can be drawn with any visual affordances assigned to it. The artificial reality system can then monitor for any triggers that will cause a change in ray casting rules. In some implementations, the trigger can be part of the user (e.g., the part from which rays are cast) entering a volume element. For example, a user putting his hand in a specified volume containing a map object can trigger application of ray casting rules defined to create a ray with an end that will snap to a closest selectable part of the map and magnify it. In other implementations, the trigger can be a selection of an element with assigned ray casting rules. For example, a default ray casting modality can be to cast rays straight out from the user's hand and the user can use this modality to select a globe object with rules assigned that project a ray out from the user's eye, while mapping rotation of the globe on the X axis according to movement of one of the user's hands and rotation of the globe on the Y axis according to movement of the other of the user's hands. In yet other embodiments, ray casting rules can be mapped to gestures or other controls, such that performing the gesture or activating the control will cause the current ray casting rules to change. For example, when the user's hand is rotated to the side a ray can be projected out straight from the hand and when the user makes a gesture opening his hand with the palm facing down, a downward ray can be projected from the user's palm.

When a trigger is identified, the artificial reality system can retrieve the ray casting rules associated with the trigger (e.g., associated with the element where the trigger occurred or associated with the gesture or other control). In some implementations, the artificial reality system can display a transition, signaling to the user the change in ray casting rules, such as an animation of the ray changing orientation or morphing its shape. The artificial reality system can then apply the rules so further actions of the user are interpreted to control the ray casting under the applied rules.

In some implementations, the artificial reality system can cast multiple rays at the same time, controlled by the same feature of the user (e.g., hand, eye, controller, etc.) The artificial reality system can determine, at any given time, which ray is active by evaluating conditions such as where the artificial reality system determines the user's focus is directed, which rays are intersecting with actionable objects, and/or a priority hierarchy established among the multiple rays. In various implementations, rays not identified as the primary ray can be hidden or shown as diminished as compared to the primary ray. When the user indicates an action (e.g., bringing finger and thumb together to indicate a "click") the action is performed in relation to the ray determined to be primary at that time.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

There are existing XR systems for casting rays that select and interact with objects in artificial reality environments. However, such ray casting systems are inaccurate, imprecise, and/or provide limited functionality in certain circumstances. For example, a system that only has rays cast straight out from a hand can be difficult to use when selecting occluded objects. As another example, a system that only casts rays of infinite length can be difficult to use to select a nearby target. Further, rays cast only a short distance can be impossible to use to interact with distant objects. Thus, existing XR systems that provide a single ray casting modality force users to use such a modality without regard to another modality being more effective in some circumstances. Furthermore, systems that provide adjustments to rays, such as allowing the user to adjust a ray curvature, puts the onus on the user to select the ray casting rules. The existing ray casting systems end up being inaccurate, frustrating, and time-consuming for users to operate.

The ray casting rule switching system and processes described herein overcome these problems associated with conventional XR interaction techniques, and are expected to provide users with greater control over object interactions, offer more functionality, be more natural and intuitive than interactions in existing XR systems, and not require manual ray casting rule selections by end users. Despite being natural and intuitive, the systems and processes described herein are rooted in computerized artificial reality systems instead of being an analog of traditional object interactions. For example, existing object interaction techniques fail to describe multiple different ray casting rules for the same 3D space, much less provide for customizations of those rules for different elements. Furthermore, existing XR systems do not provide multiple rays cast based on the same user control, where the ray that is used to implement a user action is selected based on context and intent.

Several implementations are discussed below in more detail in reference to the figures. FIG. 1 is a block diagram illustrating an overview of devices on which some implementations of the disclosed technology can operate. The devices can comprise hardware components of a computing system 100 that manages ray casting in a 3D environment by allowing different ray casting rules to be assigned to elements, setting ray casting rules for elements in response to triggers, and managing multiple simultaneous rays. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, ray manager 164, and other application programs 166. Memory 150 can also include data memory 170 that can store data which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
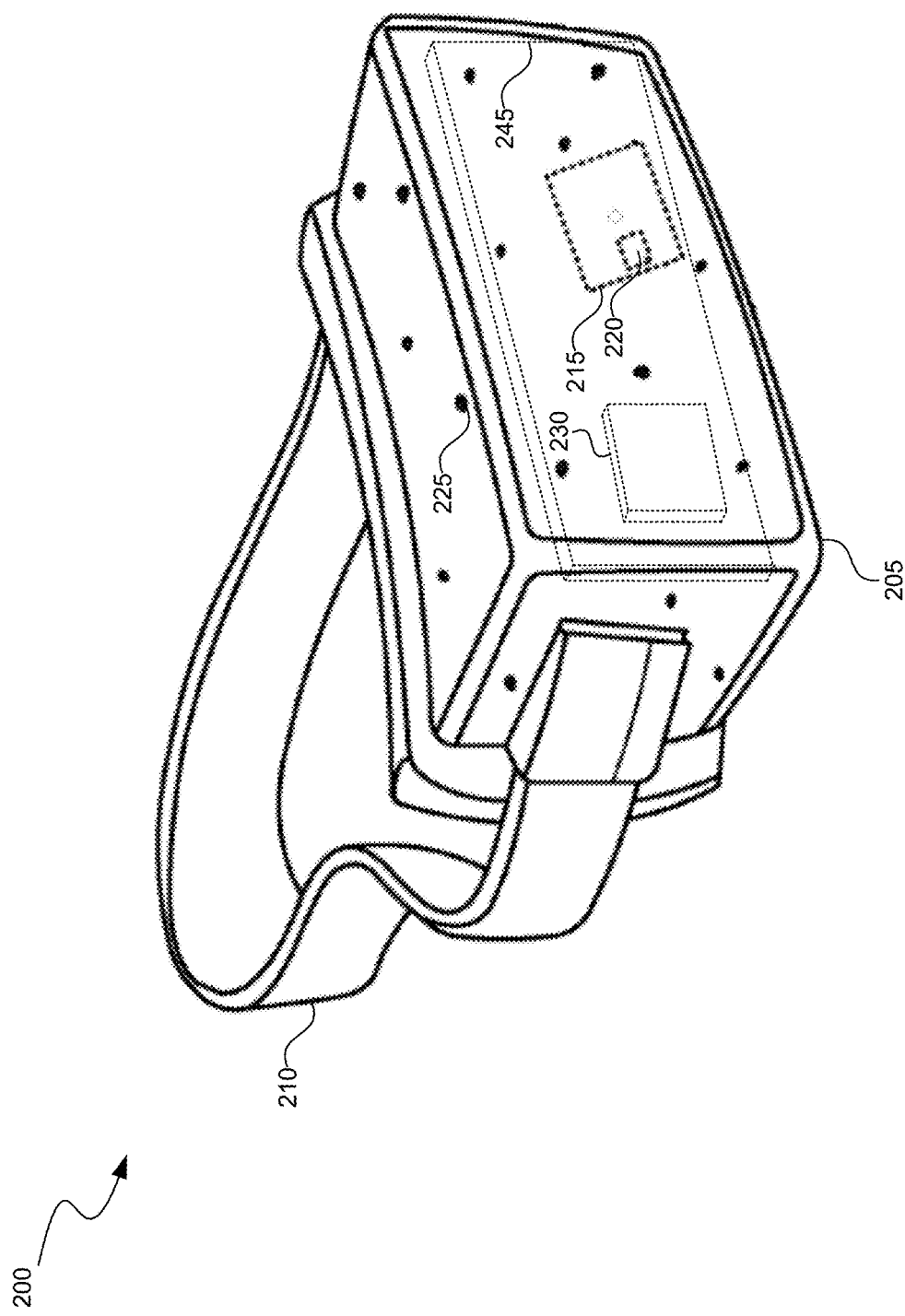
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
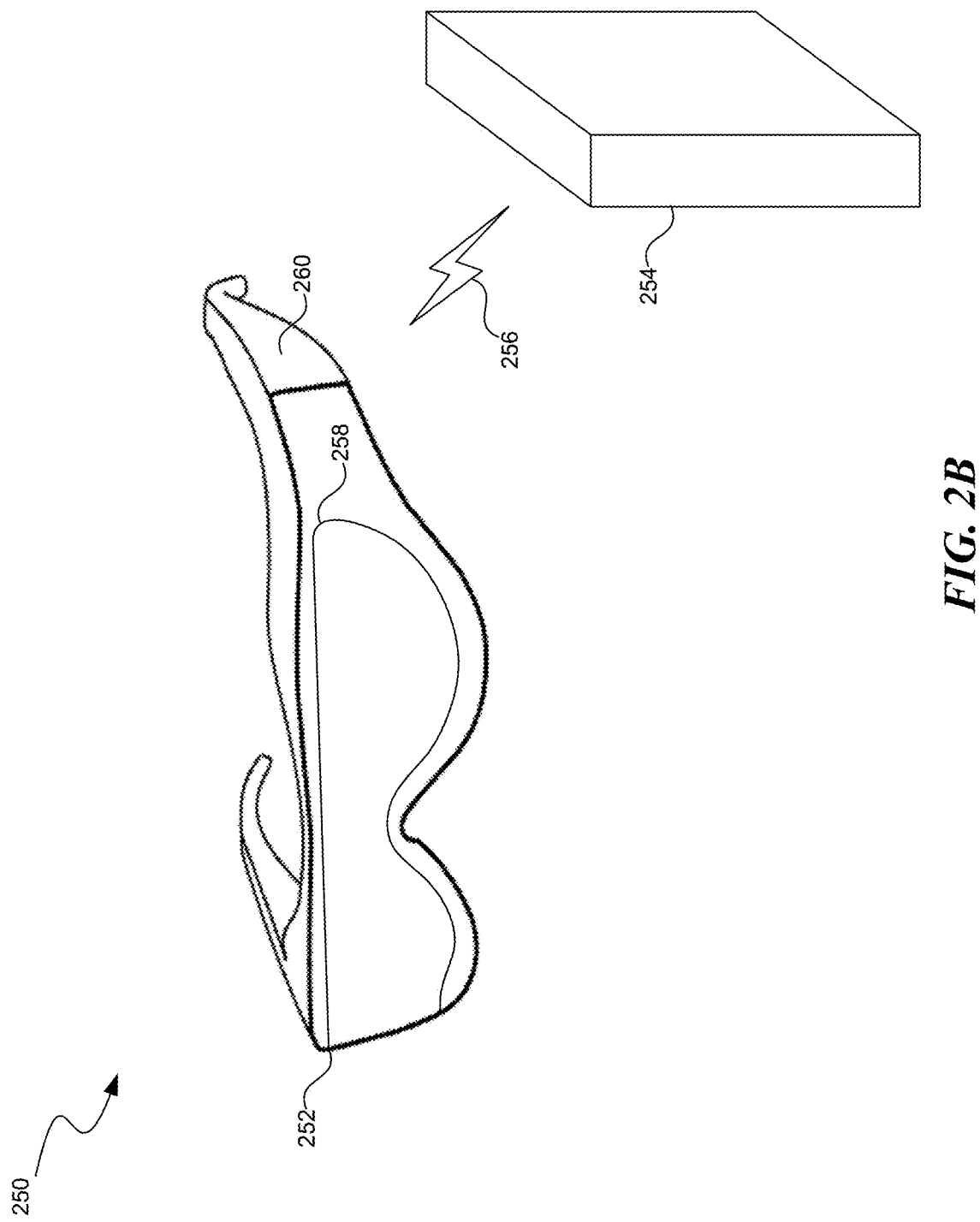
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
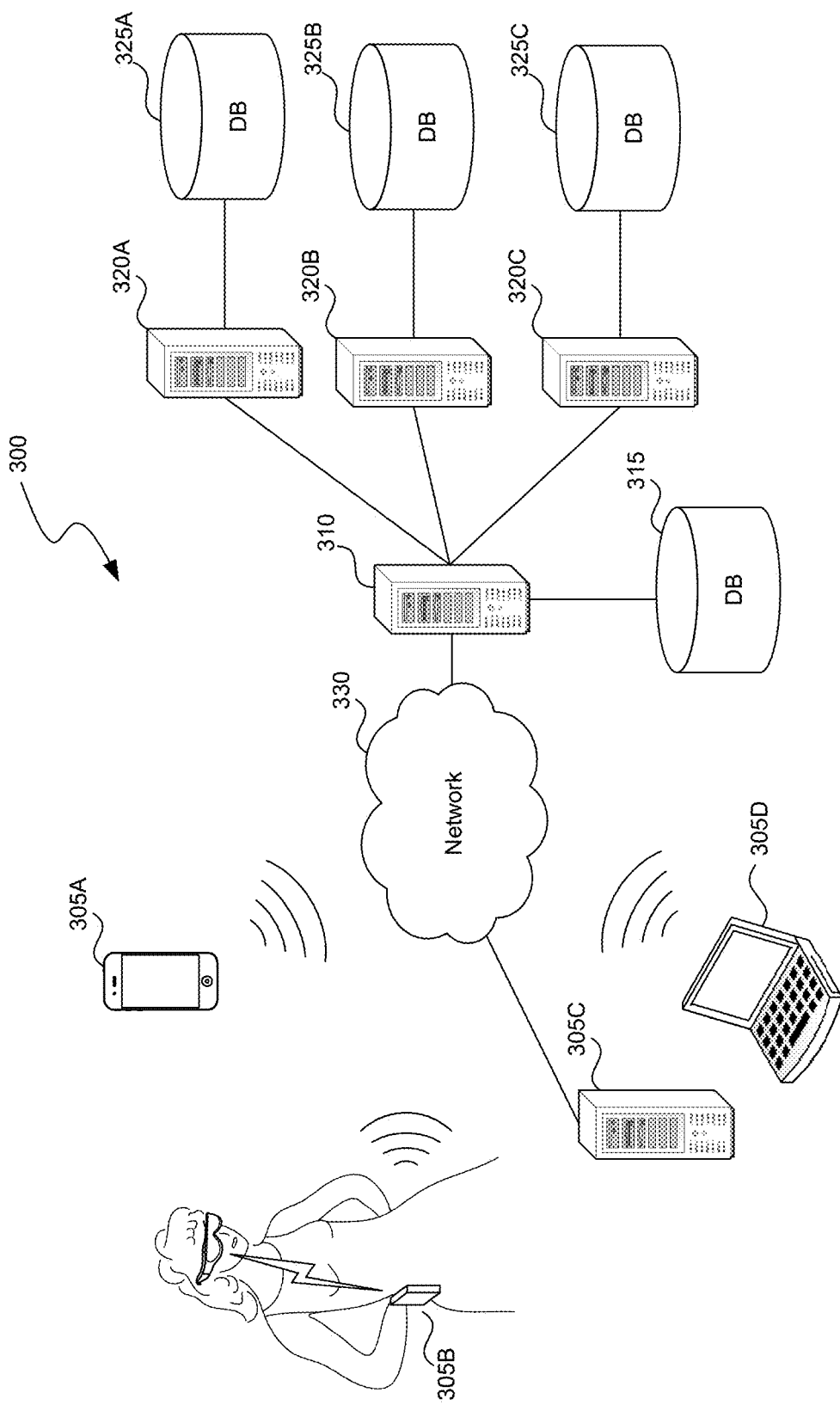
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
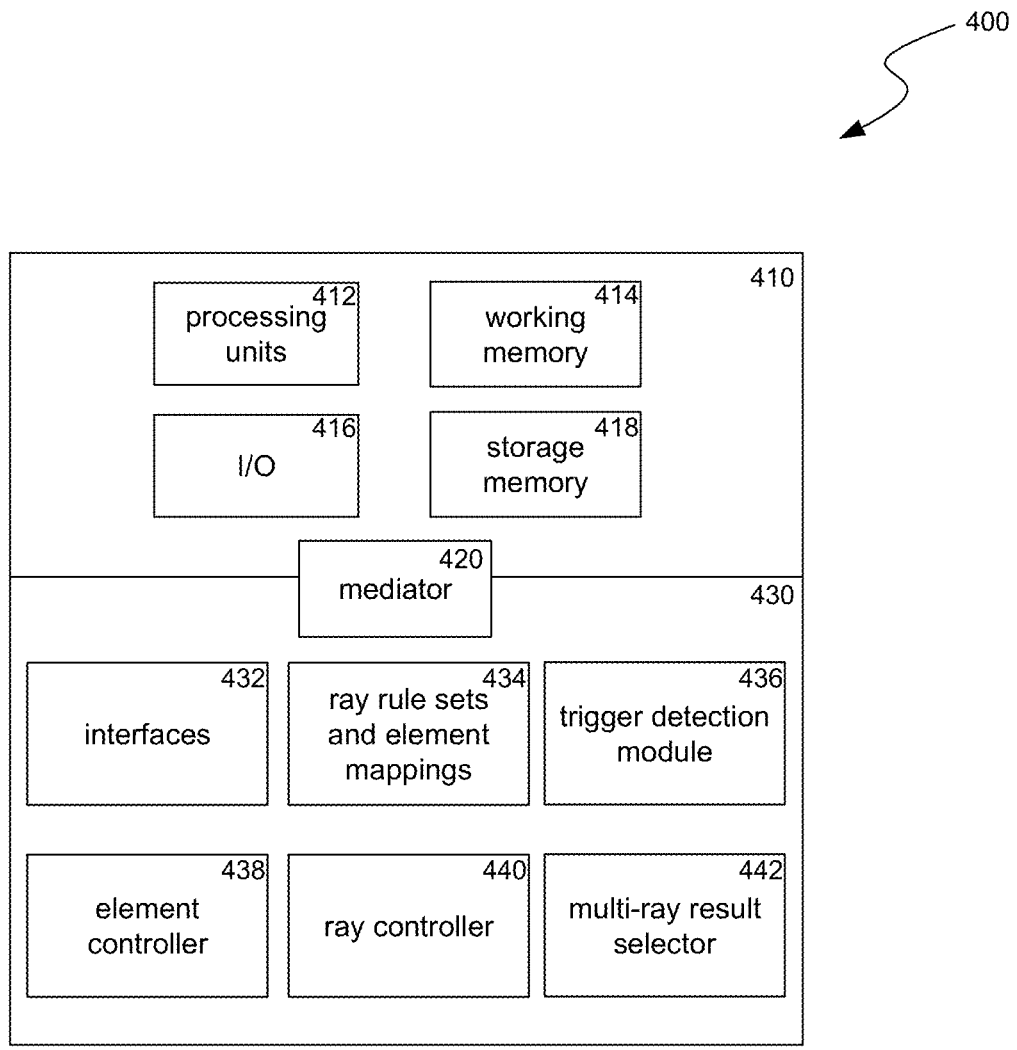
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for managing different ray casting rules in a 3D environment. Specialized components 430 can include, for example, ray rule sets and element mappings 434, trigger detection module 436, element controller 438, ray controller 440, multi-ray result selector 442, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Ray casting rule sets and element mappings 434 can include ray casting rule sets that have been mapped to particular elements. Though shown as a particular module, in some implementations the ray casting rule sets and element mappings 434 can be distributed in different data sources, such as in files or other data objects associated with particular applications, defined in the code of the application, specified in a database, etc. In some implementations, the ray casting rule sets and element mappings 434 can include mappings to pre-defined sets of ray casting rules, e.g., by referencing an identifier for the defined ray casting rule set.

Examples of ray casting rule sets include a "normal" ray casting rule set, a "limited" ray casting rule set, a "downward" ray casting rule set, a "remote" ray casting rule set, an "anchored" ray casting rule set, a "forward" ray casting rule set, a "curved" ray casting rule set, and a "sphere" ray casting rule set.

The "normal" ray casting rule set can specify a ray originating at a user's fingertips or from a controller, extending along a line defined by A) the fingertips to the user's wrists or B) a center line of the controller. The ray can be a single, straight line of infinite length. The "limited" ray casting rule set can specify a ray in the same manner as the normal ray casting rule set, except the ray is only a fixed length (e.g., 18 inches, 3 feet, etc.)

The "downward" ray casting rule set can specify a ray originating from the controller or a point on the user's hand (e.g., center of her palm), that points down to be perpendicular with a floor plane or a plane defined as the bottom of a volume. In some implementations, instead of using the floor plane or bottom of the volume, this ray casting rule set can use another defined surface that the ray remains perpendicular to.

The "remote" ray casting rule set can operate similarly to the downward ray casting rule set, except that the ray's origin point is on a specified surface and moves relative to the user's hand or controller which may be remote from the defined origin surface. In some implementations, the magnitude of the user's movements may be modified on the origin surface, such that large hand movements produce a smaller change in the ray origin point or such that small hand movements produce a larger change in the ray origin point. In some implementations, the user's hand movements can map to 2D left/right/forward/back movements to left/right/up/down movements of the ray origin point.

The "anchored" ray casting rule set can specify a position of the ray based on an origin point and a control point. A line extending from the origin point through the control point can be set as the center of the ray. The origin point can be a tracked part of a user's body, such as a dominant eye, a hip, or a shoulder, and the control point can be a controller or part of a user's hand such as fingertips, a palm, a wrist, or a fist.

The "forward" ray casting rule set can specify that rays are all perpendicular to an input surface. For example, if an input surface is a tablet, rays originate at the user's hand but are directed to be perpendicular to the surface regardless of an angle of the user's hand.

The "curved" ray casting rule set can operate like the normal ray casting rule set, except that the line emanating from the origin point is curved (e.g., downward) by a specified curvature.

The "sphere" ray casting rule set can specify the line of a traditional ray will be replaced with a sphere fixed to the user's hand or controller.

The above examples of ray casting rule sets are not exhaustive and, in fact, there are innumerable ray casting rules that can be set using the disclosed technology. Some additional examples of projection (e.g., ray) interaction systems that can be selected or customized using the disclosed technology are described in U.S. patent application Ser. No. 16/578,221, titled PROJECTION CASTING IN VIRTUAL ENVIRONMENTS, U.S. patent application Ser. No. 16/578,236, titled GLOBAL AND LOCAL MODE VIRTUAL OBJECT INTERACTIONS, U.S. patent application Ser. No. 16/578,240, titled THREE-STATE GESTURE VIRTUAL CONTROLS, U.S. patent application Ser. No. 16/578,260, titled VIRTUAL INTERACTIONS AT A DISTANCE, and U.S. patent application Ser. No. 16/661,945, titled 3D INTERACTIONS WITH WEB CONTENT, each of which is herein incorporated by reference in its entirety. Additional details on assigning and storing mappings of ray casting rules to elements are discussed below in relation to FIG. 5A.

Trigger detection module 436 can detect when a trigger event occurs signaling that the system should switch ray casting rules. In various implementations, trigger detection can occur by applications registering which events will trigger a ray casting rule change or the system can determine from the ray casting rule sets and element mappings 434 a trigger event that corresponds to each mapping. For example, a trigger event can specify a change in ray casting rules in various circumstances such as when part of a user enters a volume mapped to the new ray casting rules, when a user interacts with an object element mapped to the new ray casting rules, or when the user performs a gesture mapped to the new ray casting rules. Additional details on detecting triggers for changing ray casting rules are discussed below in relation to block 554 of FIG. 5B.

Element controller 438 can apply indicators to drawn elements signifying to users that entering or interacting with the element will cause a change in ray casting rules. For example, icons, colors, highlights, or text can be shown which will provide these signals to users, making the transitions between ray casting rules expected, removing potential confusion. Additional details on displaying elements according to associated ray casting rules are discussed below in relation to block 552 of FIG. 5B.

Ray controller 440 can receive ray casting rules from ray casting rule sets and element mappings 434, when that mapping is triggered by trigger detection module 436. Ray controller 440 can then change properties of the rays according to the received ray casting rules, e.g., changing shape, size, angles, effects, origin point, control dynamics, etc. In some implementations, ray controller 440 can also cast multiple rays at the same time where only one of the multiple rays, selected as primary by multi-ray result selector 442, will be used to interact with environment elements. In various implementations, only the primary ray is shown to the user, or non-primary rays are displayed as diminished as compared to the primary ray. Additional details on retrieving and applying ray casting rules are discussed below in relation to blocks 556 and 560 of FIG. 5B. Additional details on casting multiple rays are discussed below in relation to FIGS. 11, 12A, and 12B.

Multi-ray result selector 442 can determine which of multiple rays cast by ray controller 440 is a primary ray by applying priority rules. The primary ray is a ray that the user can use for interactions, while other rays are inactive until they are determined to be the primary ray. In various implementations, the rules that determine which ray is the primary ray can be based on a variety of factors such as: a pre-defined hierarchy of the rays, a determination of where the user's focus is, and/or rays identified as being actionable. In some implementations, multiple of these factors can be applied by using some as binary selectors (i.e., filters) for rays that are eligible to be selected as primary, using factors as weights for determining relative importance of rays, and/or for ranking rays. Additional details on selecting a primary ray from among multiple rays are discussed below in relation to block 1104 of FIG. 11 and FIGS. 12A and 12B.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5A:
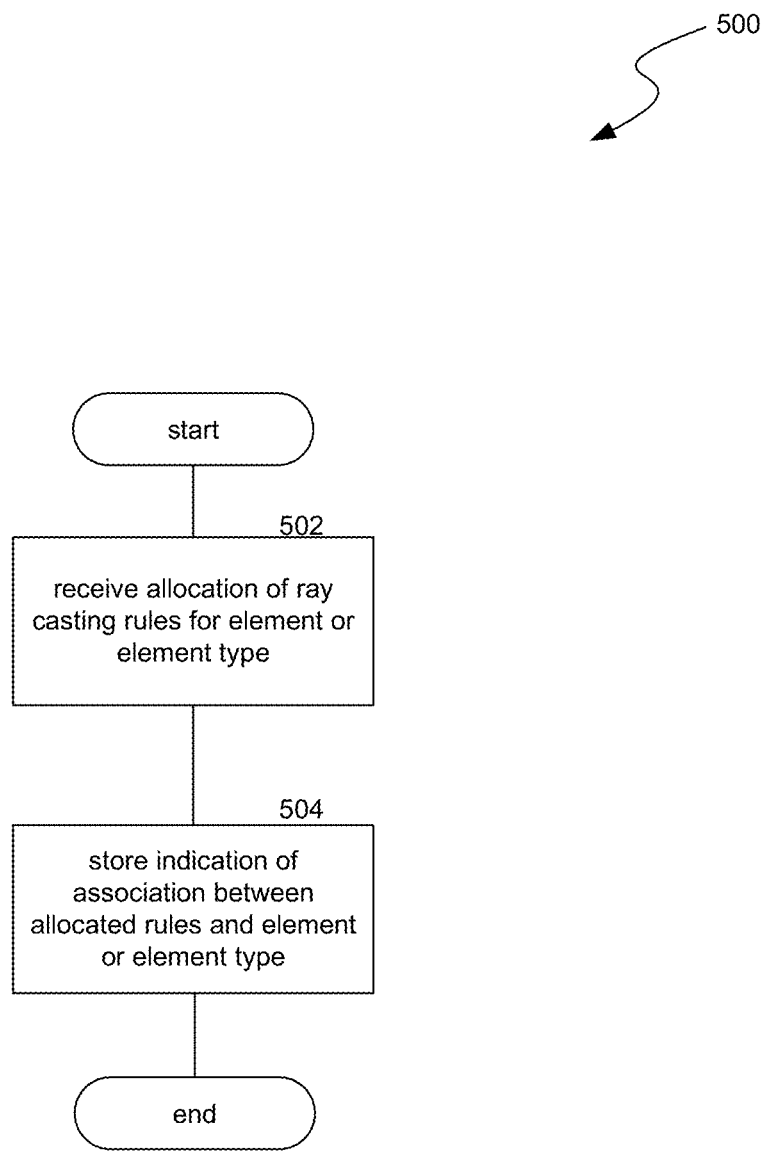
FIGS. 5A and 5B are flow diagrams illustrating processes used in some implementations of the present technology for assigning ray casting rules to elements and applying ray casting rules corresponding to trigger events.

FIG. 5A is a flow diagram illustrating a process 500 used in some implementations of the present technology for assigning ray casting rules to elements. In some implementations, process 500 can be performed on a computing system under the direction of a content creator or developer. For example, a developer of an application can use process 500 to assign ray casting rules to elements or types of elements that the application may create.

At block 502, process 500 receives an allocation of ray casting rules for an element or for elements of a type. In various implementations, the ray casting rule allocations can be made in various ways such as in the code of a program, in a mapping of A) elements or element types to B) defined ray casting rules or ray casting rule sets, as a declaration or other structured format, etc.

For example, code for an application can include a function call from the application to a control program of the XR system to create a virtual object or to request allocation of a volume for the application to draw into (i.e., allocation of an element). This function call can include a parameter identifying one or more ray casting rules corresponding to the element (e.g., specifying a name of an established ray casting rule set, providing a reference to a ray casting rule data object defining one or more rules, etc.) As a more specific example, a shell program for the XR system may provide an interface for requesting a volume as follows: getVolume(volumeID, volumeName, defaultLocation, volumeDimensions, rayCastingRuleSet), where the final parameter rayCastingRuleSet takes a list of ray casting rules (or an identifier for such a list) specifying rules that will be implemented when a user enters the volume returned by the shell program. The developer may include such a list in the program, provide instructions that cause the program to dynamically build such a list, or specify an external source from which to pull the list (e.g., see the following mapping for declaration examples). In another case, a mapping can be used to define parings between elements or element types and ray casting rules or ray casting rule sets. For example, an application developer may use a tool allowing the developer to use a GUI or other interface to select rules to apply to particular elements the application creates, e.g., "standard_box_volume"→"traditional_rays"; "table_top_volume"→"downward"; "starfield_volume"→"two_hand_variable_diameter"; etc., such that when the application requests a volume with the stated name it will set the corresponding ray casting rules. Similarly, a ray casting rule set for an element or element type can be specified, e.g., as structured data (e.g., as XML or a JSON blob). For example, the "downward" ruleset can be defined in a JSON blob as {ray_orientation:parallel_to_Y-axis, ray_direction:away_from_user; ray_origin:middle_of_palm; ray_object_passthrough:no; ray_length:infinite; ray_effect:standard; [etc.]}.

In various implementations, ray casting rules can be assigned to individual elements, e.g., when an application creates an element the application can be configured to assign that element a set of ray casting rules, or elements can be assigned types, which have been set up (e.g., by the application developer) to be associated with pre-defined ray casting rule sets. For instance, in the mapping example above, the "table_top_volume"→"downward" specifies that a volume assigned the "table_top_volume" type should be assigned a defined ray casting rule set labeled "downward." Further ray casting rules can be assigned to volumes (which may have different shapes or other properties) or to objects (which may be real or virtual). For example, when an application is granted a volume to write into, the volume can have ray casting rules that activate when the user enters that volume. As another example, when an application causes a virtual object to be created, that object can be assigned ray casting rules that activate when the object is picked up. In yet another example, when an application is active and is provided an identification of a real-world object, the application can supply back a set of ray casting rules to apply when that object is selected or the user is within a threshold distance of the object.

In various implementations, an allocation of ray casting rules to an element can also specify the triggers that will cause the ray casting rules to be implemented. For example, triggers can specify ray casting rules to apply based on entering a volume, selecting an object, touching an object, being within a threshold distance of an element, a specified relationship between elements (e.g., implement rules when an object having a particular type enters a volume), performing a particular gesture or activating control, etc.

In some implementations, multiple ray casting rule sets can be applied to the same elements or to a set of nested elements (e.g., an object or volume inside another volume). The ray casting rule sets can be associated with different contexts or with different triggers causing their activation. For example, contexts for activating a ray casting rule set include identifying certain characteristics of the user, identified relationship to other elements, distances between the user and the element, etc. In some implementations, ray casting rule sets can have an inheritance system whereby nested elements use the rule set of the parent element unless a rule is superseded by a ray casting rule assignment for the nested element. In other implementations, nested elements with assigned ray casting rules that do not specify certain types of ray casting rules can use default values for those unspecified ray casting rules.

In some implementations, the XR system can automatically identify ray casting rules to apply to elements. For example, element characteristics can be mapped to various ray casting rule sets or observed user interactions with elements (or elements identified as similar, e.g., by a machine learning system) and the XR system can identify that those types of interactions have typically been facilitated by a switch to a particular set of ray casting rules. In some implementations, this mapping or interaction type pairing can be performed using a machine learning model, where the model can be trained, e.g., with training items A) that pair developer selected ray casting rules to element characteristics, B) that pair users' selections of ray casting rules to particular elements, or C) that pair based on metrics determined for observed user interactions. For example, the amount of time it takes users to perform an action and/or the number of times that action must be attempted can be tracked for element types to determine which ray casting rule sets produce better interaction metrics, which the system can then use for positive and negative training examples for selecting ray casting rules for new elements given their characteristics.

At block 504, process 500 can store one or more indications of the associations between elements or element types and ray casting rules from block 502. In various implementations, these indications can be stored as part of source code or in local or remote data resources accessible by the program (e.g., in a database, in a data file, in local or global variables, etc.) In some implementations, ray casting rule sets can be established as shareable ray casting modalities that can be transferred and used by other developers. Thus, the ray casting rule framework described herein can serve as a basis for creating standard libraries of ray casting rule sets that can be selected for various use cases. This can allow developers or automated systems to identify interaction types for elements and select, or have the system automatically select, a ray casting rule set identified as most appropriate for that interaction type.

Figure 5B:
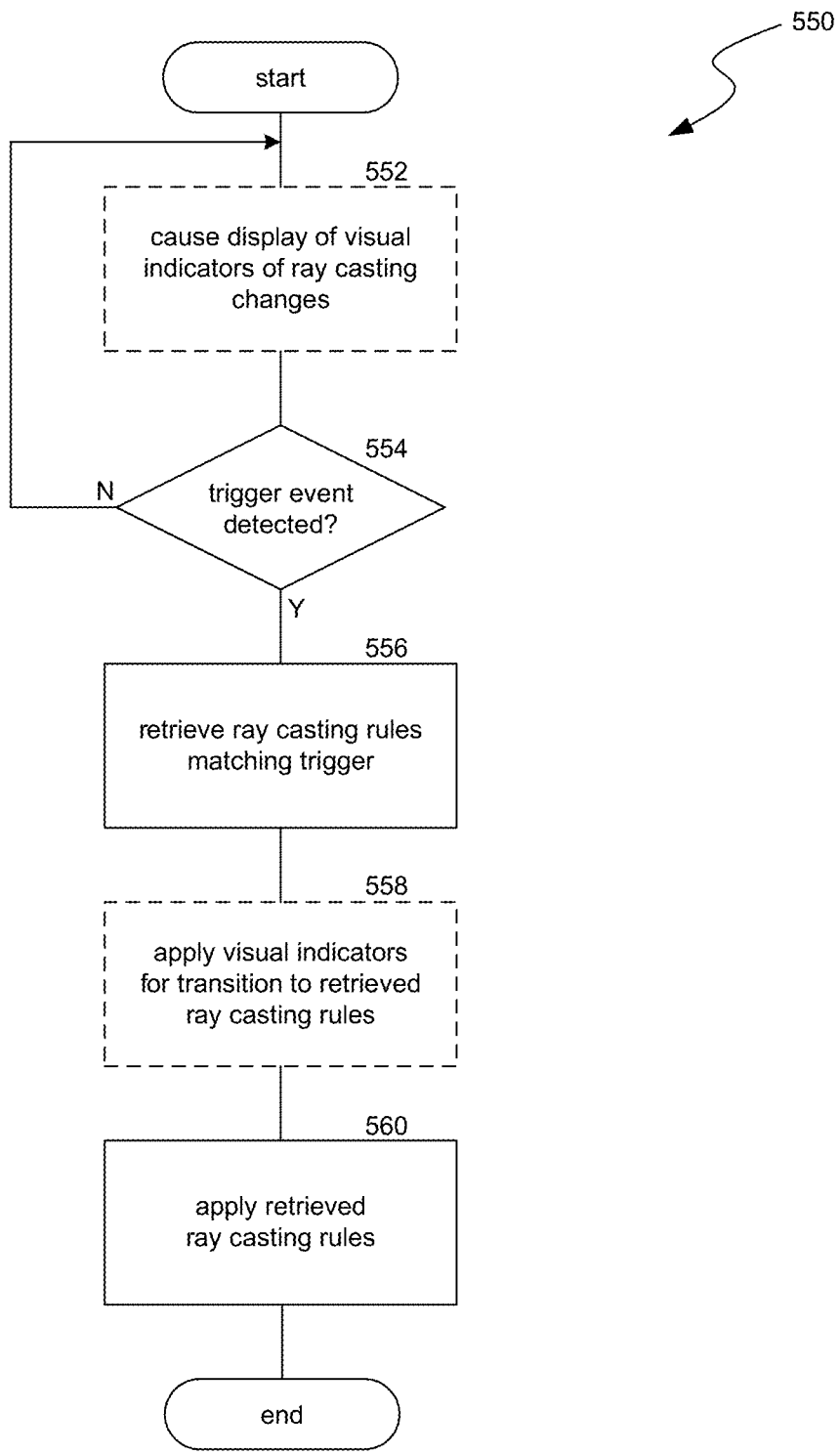

FIG. 5B is a flow diagram illustrating a process 550 used in some implementations of the present technology for applying ray casting rules corresponding to trigger events. In some implementations, process 550 can be performed by an XR system while running the applications that create and control the elements for which process 500 (FIG. 5A) has assigned ray casting rules. Blocks 552 and 558 in process 550 are in broken lines to specifically call out that, in some implementations, these steps are not performed. However, as noted above, in various implementations, no steps are required and steps can be rearranged or removed. As applications cause virtual objects to be created and/or request virtual spaces to write into, the application can supply the ray casting rules that were defined during process 500 and/or the XR system can generate them "just-in-time."

At block 552, process 550 can cause the display of visual indicators or "affordances" that signal elements that have alternate ray casting rules. In various implementations, these affordances can be displayed all the time or upon certain events, such as the corresponding element being selected or identified as the target of the user's gaze. For example, when a volume with alternate ray casting rules is selected, a "wireframe" can be put around the volume and an icon defined for the ray casting rule set associated with that volume can be put on the box defined by the wireframe (see e.g., icons 606 and 610 on the wireframe for volume 604 in FIG. 6).

In some implementations, when an application causes an object to be created or requests a volume to write into, the application can supply, to a system controller (e.g., shell program or operating system) for the XR system, the ray casting rules to apply to that element (as defined by process 500 of FIG. 5A) and one or more affordances (e.g., an icon) to be set for that element. In other implementations, the application controlling the elements can manage applying affordances those elements. In yet other applications, the system controller can automatically supply affordances, e.g., where an indicator signals that ray casting rules change for that element or pre-mapped affordances are used for different types or sets of ray casting rules.

At block 554, process 550 can determine whether any trigger events for changing ray casting rules have occurred. In various implementations, the XR system, an active application, or both can be responsible for determining whether a trigger event has occurred. Trigger events can include any identifiable action that can be mapped to a set of ray casting rules. Some trigger events can include entering a volume element, selecting or picking up an object element, or performing a particular gesture or activating an explicit control for changing ray casting rules (e.g., in a menu). In some implementations, when an application causes a virtual object to be created or requests a virtual space to write into, the application can supply the XR system with the trigger events that will cause the change in ray casting rules, allowing the XR system set register watching for those events and implement the indicated ray casting rules upon the trigger event occurring. In a first case, the trigger events can be associated with particular elements (e.g., activate when a user's hand or controller enters a volume) while in a second case the trigger event can be general (e.g., activate when a user performs a particular gesture). In the first case, the trigger event can be linked to ray casting rules via the ray casting rules association with the element. In the second case, the trigger event can be linked directly to the ray casting rules in a mapping for the XR system.

In some implementations, multiple sets of ray casting rules can be mapped to the same element corresponding to different triggers. Process 550 can be configured to detect triggers for different contexts, e.g., depending on characteristics of the user, identified relationships between elements, distances between the user and the element, etc. As a more specific example, when a volume element is selected (a first trigger) from the outside a first ray casting rule set can be applied and when the user's hand enters that volume (a second trigger) a second ray casting rule set can be applied.

Each of these triggers can be registered for the XR system to monitor and linked to corresponding rule sets.

If no trigger event is detected, process 550 can return to block 552. If a trigger event is detected, process 550 can continue to block 556.

At block 556, process 550 can retrieve the ray casting rules that match the trigger event detected at block 554. When the trigger event is associated with a particular element (e.g., a volume was entered or an object was selected), the retrieved ray casting rules can be the ray casting rules associated with that element (and in some cases associated with that trigger for that element). When the trigger event is not associated with a particular element (e.g., a ray casting rule switching gesture was performed) the trigger event can be mapped to particular ray casting rules in the XR system, which process 550 can retrieve.

At block 558, process 550 can cause visual or other (e.g., audio or haptic) transition indicators to be provided to signal a transition in ray casting rules. While not required, such indicators can signal to a user that a ray casting rule transition is occurring, significantly reducing user confusion when the user interaction mode changes. For example, when the ray casting rule change causes a change in ray origin, dimensions, or angle, an animation can slide or morph the ray to be from the new origin, have the new dimensions, or be at the new angle. As another example, where the ray casting rule change causes a change in ray function, an example of the new functionality can be shown and/or a notification explaining the functionality can be provided.

At block 560, process 550 can apply the retrieved ray casting rules. As discussed above, this can include a wide array of possible adjustments such as changing the ray direction, origin point, control point, length, width, shape, how actions by the user's second hand affect the ray, what effects the ray has on the artificial environment, etc. As also discussed above, in some cases, the new ray casting rules can be in pre-defined sets, providing standard interaction modalities that users can get used to and understand how to interact with them. Process 550 can repeat continuously as applications continue to create objects or request volumes with assigned ray casting rules or there are gestures or controls mapped to ray casting rule changes.

Figure 6:
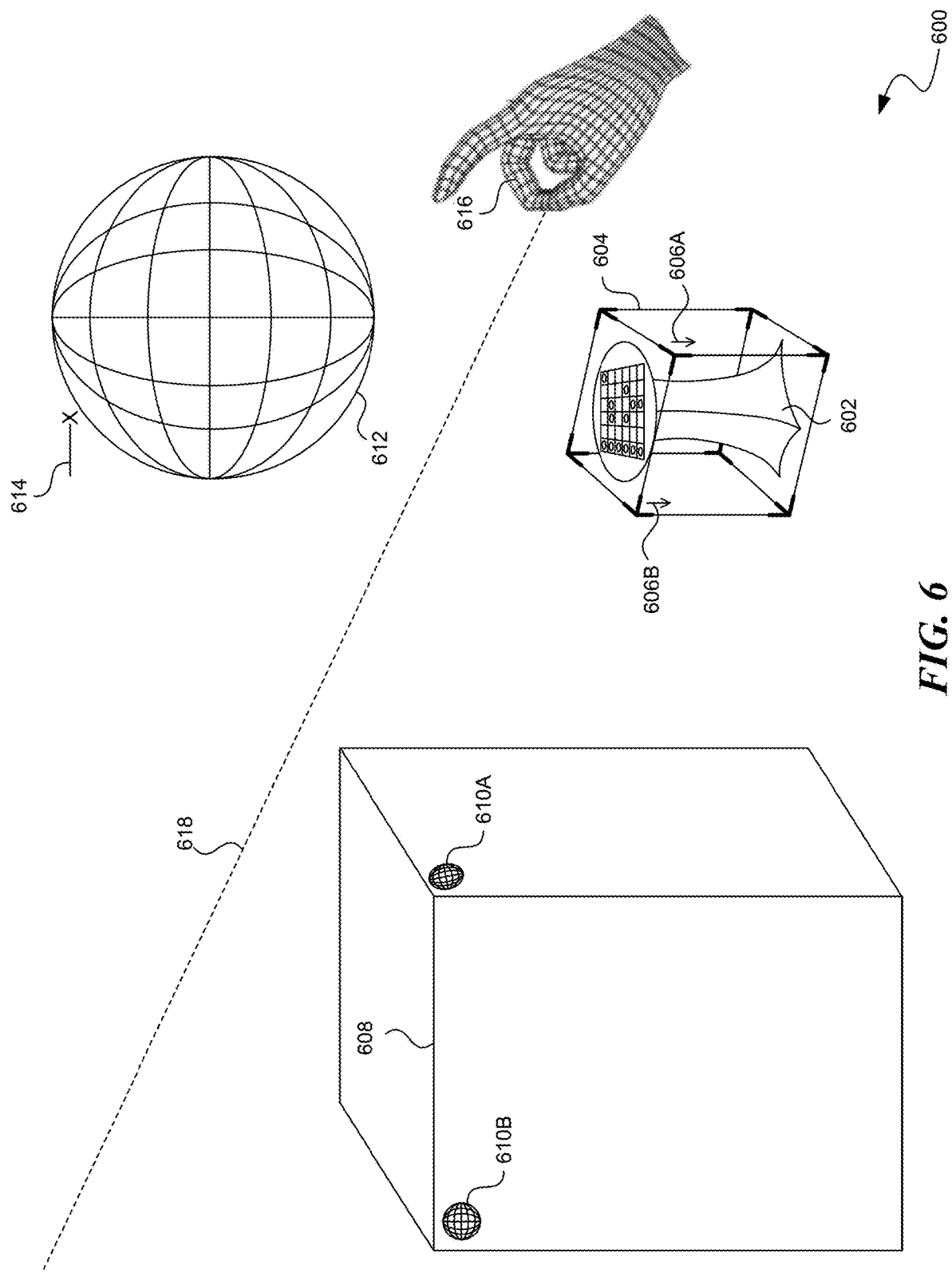
FIG. 6 is a conceptual diagram illustrating an example of multiple elements displayed in a 3D space with different ray casting rule sets.

FIG. 6 is a conceptual diagram illustrating an example 600 of multiple elements displayed in a 3D space with different ray casting rule sets. Example 600 includes three virtual elements: cuboid volume 604 (surrounding object 602), cuboid object 608, and spherical volume 612.

Volume 604 has a "downward" ray casting rule set applied to it. Corresponding visual affordances 606A and 606B are icons displayed when a wireframe for the volume 604 is displayed, signifying that when the user's hand enters the volume 604 the rays will transition to being cast straight toward the bottom of the volume, originating from the user's hand (see FIG. 7).

Object 608 has a "spherical" ray casting rule set applied to it. Corresponding visual affordances 610A and 610B are icons displayed on the object 608, signifying that when object 608 is selected, the ray will be replaced with a sphere originating at the user's hand (see FIG. 9).

Spherical volume 612 has a "limited" ray casting rule set applied to it. Corresponding visual affordance 614 is an icon displayed continuously in relation to volume 612, signifying that when the user's hand enters the volume 612 the rays will transition to being shortened to a particular length (see FIG. 8).

In example 600, user hand 616 has not entered volume 604 or 612 and has not selected object 608. Thus, default ray casting rules are being used, casting ray 618 straight out from the user's hand 616.

Figure 7:
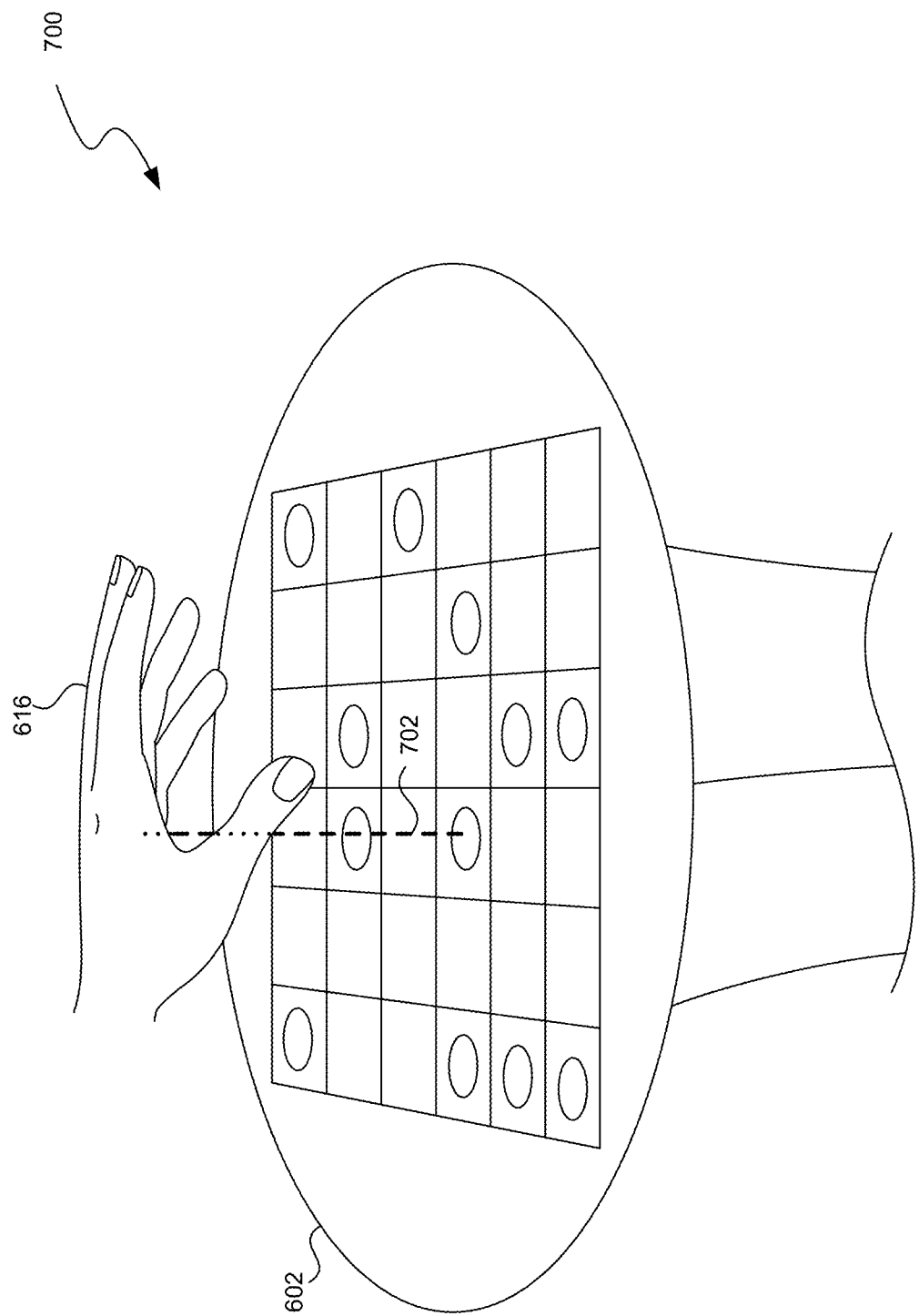
FIG. 7 is a conceptual diagram illustrating an example of an activated downward ray casting rule set corresponding to a volume the user has entered.

FIG. 7 is a conceptual diagram illustrating an example 700 of an activated downward ray casting rule set, corresponding to the volume 604. In example 700, the user has put her hand 616 inside volume 604 (not shown—see FIG. 6), which the XR system identifies as a trigger for changing ray casting rules. In response, the XR system has retrieved and applied the "downward" ray casting rules associated with volume 604. In this case, applying the ray casting rules includes no longer casting ray 618 (FIG. 6), and instead casting a ray 702 originating from the user's palm and directed toward the base of the volume 604. This allows the user easy control over objects on the tabletop of object 602.

Figure 8:
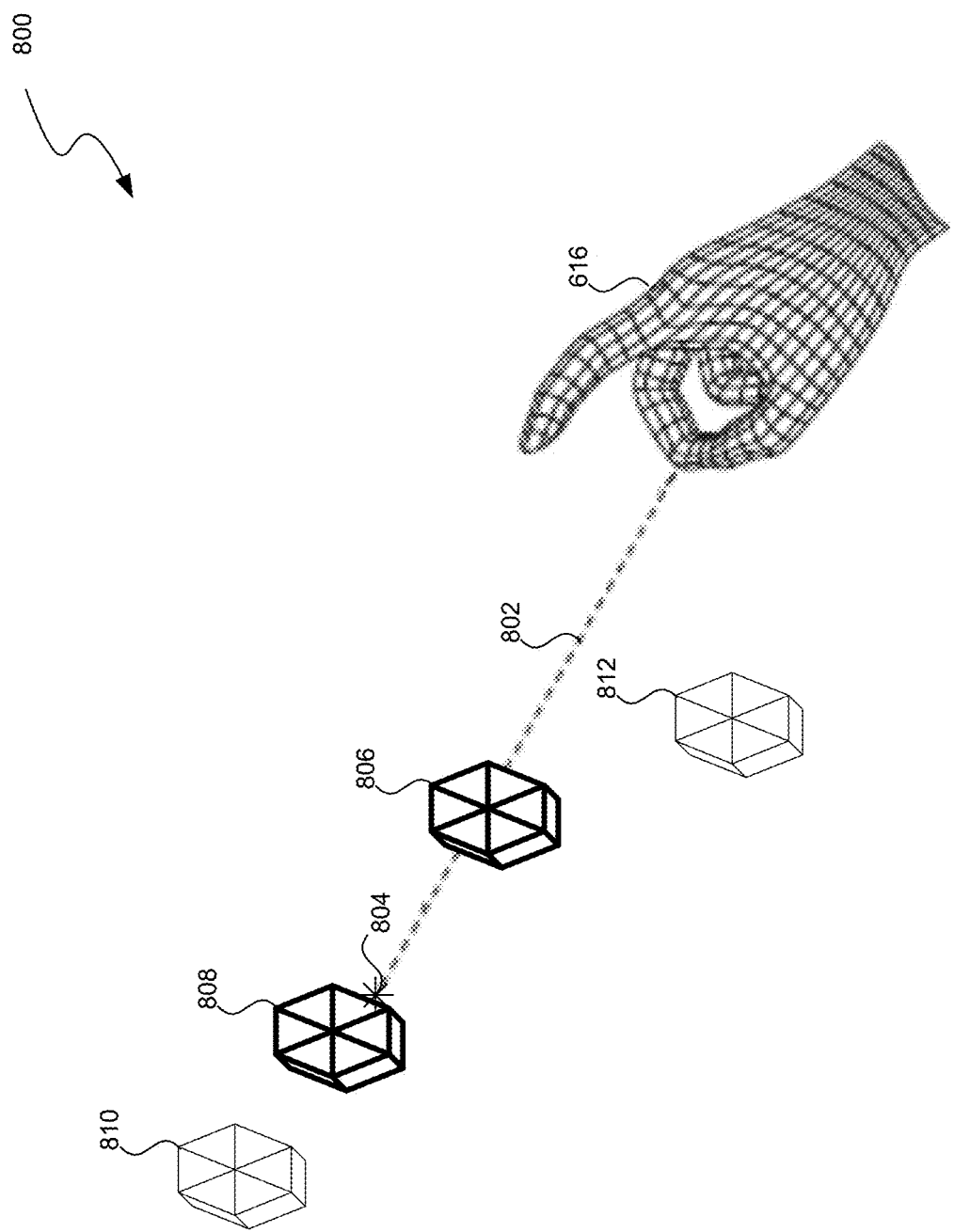
FIG. 8 is a conceptual diagram illustrating an example of an activated limited ray casting rule set corresponding to an object the user has selected.

FIG. 8 is a conceptual diagram illustrating an example 800 of an activated limited ray casting rule set, corresponding to the volume 612. In example 800, the user has put her hand 616 inside volume 612 (not shown—see FIG. 6), which the XR system identifies as a trigger for changing ray casting rules. In response, the XR system has retrieved and applied the "limited" ray casting rules associated with volume 612. In this case, applying the ray casting rules includes replacing ray 618 (which extends to infinity—see FIG. 6) with a shortened ray 802 which ends at point 804, which is three feet from the user's hand 616. Objects 806-812 are inside volume 612. Shortened ray 802 intersects objects 806 and 808, causing them to be selected (indicated by bold lines), but ends before object 810, which is therefore not selected.

Figure 9:
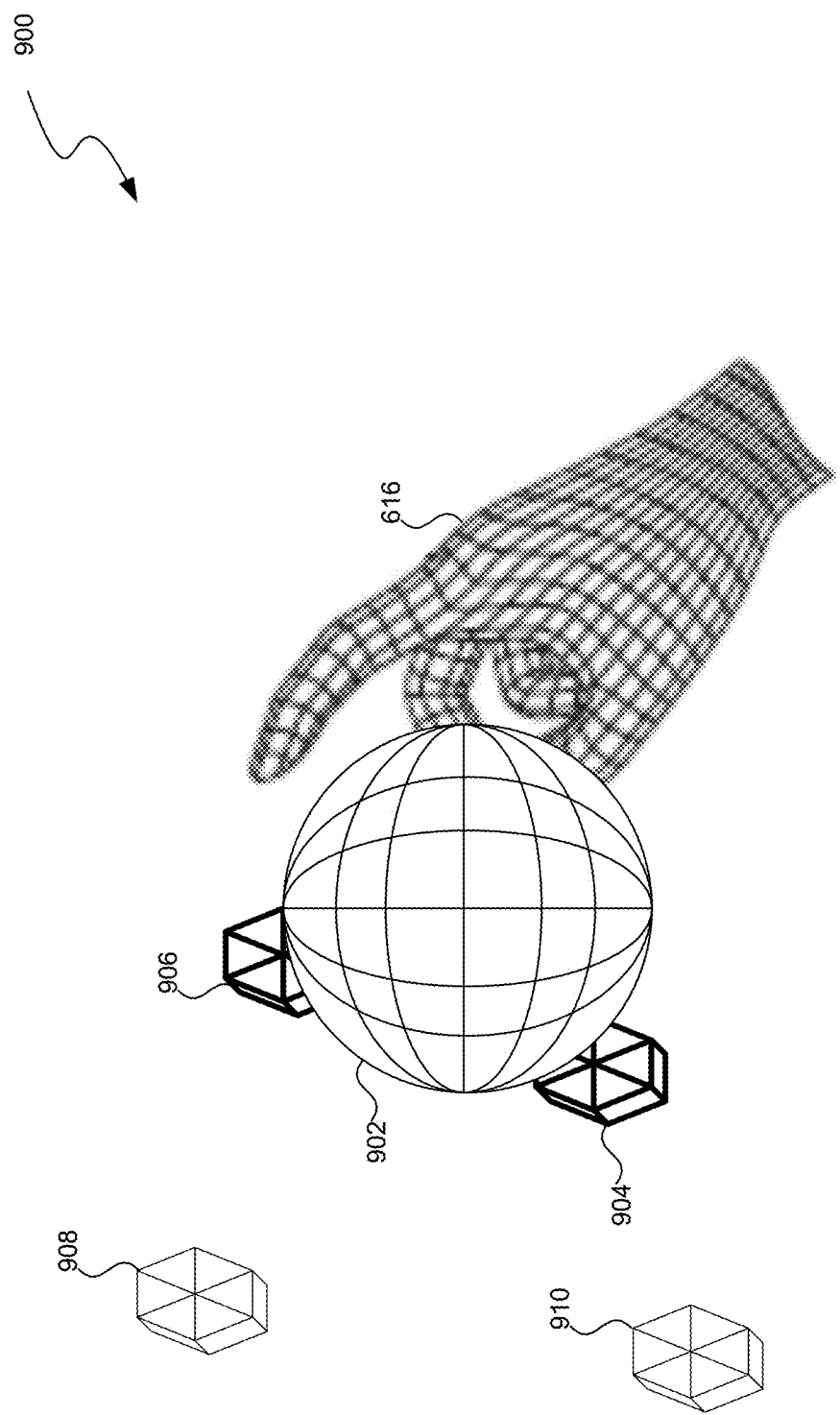
FIG. 9 is a conceptual diagram illustrating an example of an activated sphere ray casting rule set corresponding to a volume the user has entered.

FIG. 9 is a conceptual diagram illustrating an example 900 of an activated sphere ray casting rule set, corresponding to object 608 having been selected by the user. In example 900, the user has moved her hand 616, causing ray 618 to intersect with object 608, selecting it (not shown—see FIG. 6), which the XR system identifies as a trigger for changing ray casting rules. In response, the XR system has retrieved and applied the "sphere" ray casting rules associated with object 608. In this case, applying the ray casting rules includes replacing ray 618 (FIG. 6) with a selection sphere 902 anchored to the user's hand 616. In this example, selection of object 608 causes objects 904-910 to appear. Selection sphere 902 intersects objects 904 and 906, causing them to be selected (indicated by bold lines), but does not select non-intersected objects 908 and 910.

Figure 10:
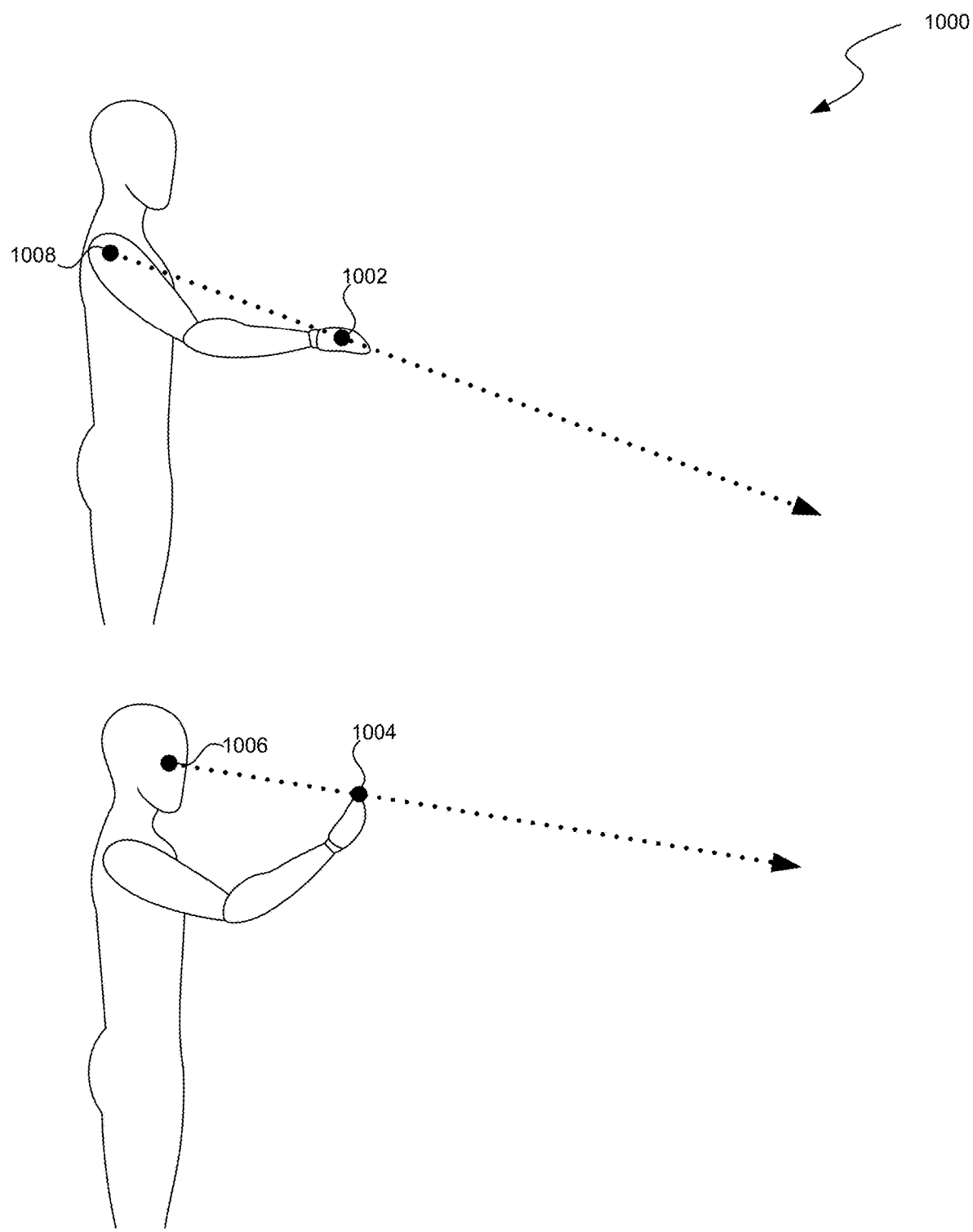
FIG. 10 is a conceptual diagram illustrating an example of an activated anchored ray casting rule set.

FIG. 10 is a conceptual diagram illustrating an example 1000 where ray casting rules have implemented an "anchored" ray casting rule set. Implementing these ray casting rules, the position of the ray is based on an origin point (e.g., points 1006 or 1008) and a control point (e.g., points 1002 or 1004). A line extending from the origin point through the control point is set as the center of the ray. In various implementations, the origin point can be a tracked part of a user's body, such as a dominant eye (point 1006), a hip, or a shoulder (point 1008), and the control point can be a part of a user's hand such as fingertips (point 1004), a palm (point 1002), a wrist, or a fist. Anchored rays that use the combination of the origin and control points can be more stable and precise than traditional ray casting. Additional details on anchored ray casting is provided in incorporated reference U.S. patent application Ser. No. 16/578,221, titled PROJECTION CASTING IN VIRTUAL ENVIRONMENTS.

Figure 11:
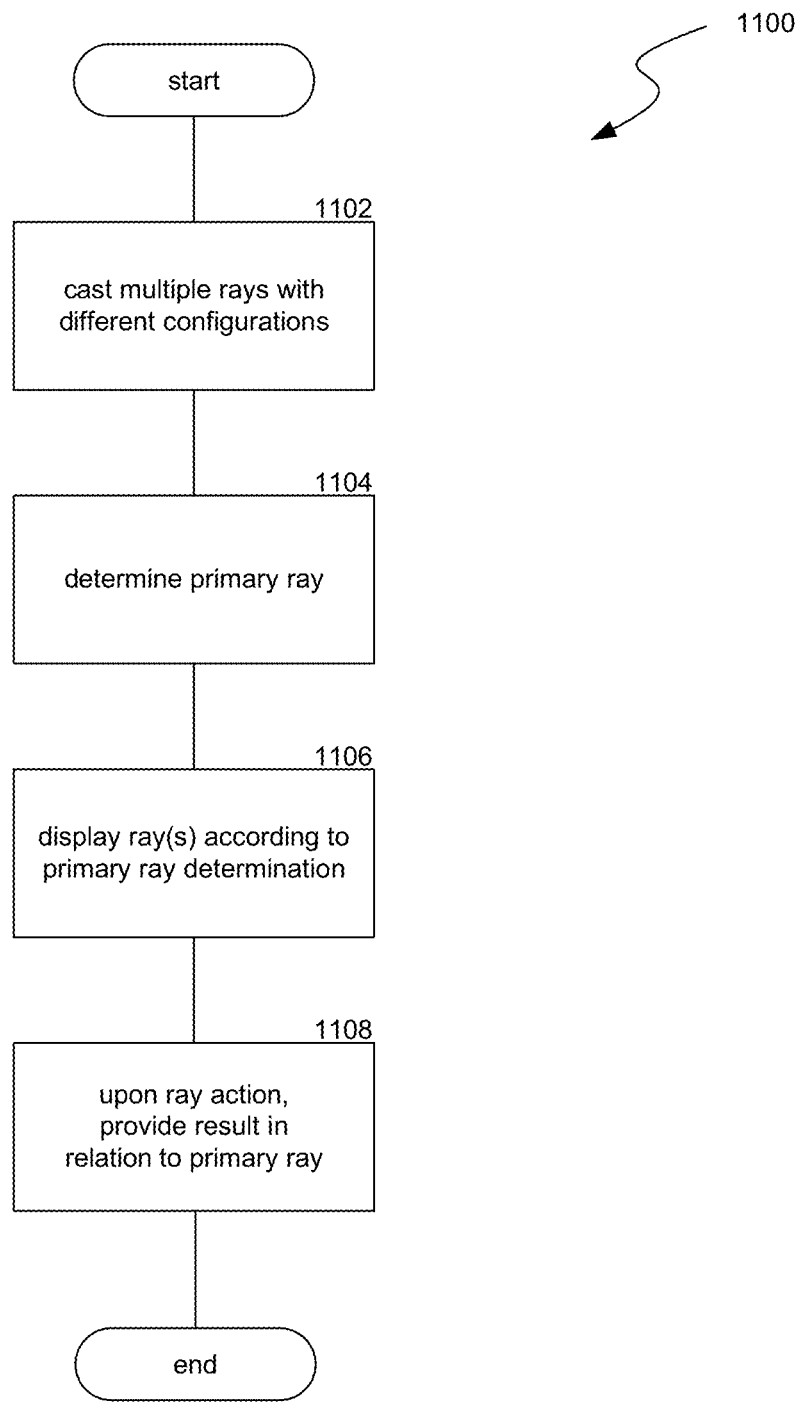
FIG. 11 is a flow diagram illustrating a process used in some implementations of the present technology for managing multiple simultaneous rays.

FIG. 11 is a flow diagram illustrating a process 1100 used in some implementations of the present technology for managing multiple simultaneous rays. Process 1100 can be performed by an XR system as a user interacts with elements in the environment.

At block 1102, process 1100 can cast multiple rays with different properties. The properties of the rays can include rays at different angles, rays with different geometries (e.g., shape or curvature), different origin points, different reactions to user movement, or rays that cause different effects when they interact with elements in the environment. For example, process 1100 can cast a ray straight out from the user's hand, a second from the user's hand that curves toward the ground, a third that projects from the user's hand straight toward the floor, and a fourth that is anchored with an origin at the user's dominant eye and a control point passing through the user's fingertips.

At block 1104, process 1100 can use rules to determine which of the multiple rays cast at block 1102 is the primary ray. The primary ray is a ray that the user can use to interact with the world, while other rays are inactive until they are determined to be the primary ray. For example, if the XR system is casting three rays and each ray intersects with a corresponding object, when the user performs a "tap" gesture to select an object, the XR system only selects the object intersected by the primary ray. In various implementations, the rules that determine which ray is the primary ray can be based on a variety of factors such as: a pre-defined hierarchy of the rays, a determination of where the user's focus is, and/or rays identified as being actionable. In some implementations, multiple of these factors can be applied by using some as binary selectors (i.e., filters) for rays that are eligible to be selected as primary, using factors as weights for determining relative importance of rays, and/or ranking rays.

For example, a pre-defined hierarchy of the rays can provide initial weights for ranking the rays, such as a weight of 0.6 for a ray extending straight out from the user's hand, a weight of 0.5 for a ray that extends out and curves down from the user user's hand, a weight of 0.4 for a ray that extends straight toward the floor from the user's hand, and a weight of 0.2 for a straight ray that angles out and up from the user's hand. As another example, if the user's focus corresponds to a ray, an additional 0.4 weight can be applied to that ray. In various implementations, user focus corresponding to a ray can be where user eye or head direction is tracked and the line from the user's head or eyes along that direction comes within a threshold distance of a ray or within a threshold distance of an object with which a ray intersects. In yet another example, a weight, such as 0.4, can be applied to a ray based on whether it is identified as being actionable. In various implementations, a ray can be identified as actionable when a result of an available user command (e.g., gesture, spoken commend, or other input) will be affected by the status of the ray. For example, an XR system may be able to detect when a user makes a "tap" gesture which causes selection of an object with which a ray intersects and thus only rays that currently intersect with a selectable object are actionable. If more than one type of weighting is applied, the various weights on each ray can be summed to determine an overall weight for each ray, and the highest weighted ray can be selected as the primary ray. The above weight values are only examples and other weights or methods of combining weights can be used. In other examples, factors for rays can apply filters instead of weights for ranking. As a specific example, some rays can only be considered for being the primary ray, e.g., when the ray is actionable or when the ray corresponds to the user's focus. In some implementations, filters may only be applied to some rays. For example, user focus can be a filter for a ray extending outward and curving down from the user's hand but may only be a weighting factor for the ray extending straight out from the user's hand. Further examples of determining which of multiple rays is the primary ray are provided below in relation to FIGS. 12A and 12B.

At block 1106, process 1100 can modify display of one or more of the multiple rays according to the selection results. In some implementations, this can include hiding all rays except the primary ray. In other implementations, this can include displaying the primary ray more prominently (e.g., as a thicker line, in a different color, as more solid, etc.) than non-primary rays. In some implementations, the rays can have different views according to their ranking from block 1104. For example, the primary ray can be highlighted, rays with above a threshold weight can be shown as diminished as compared to the primary ray, and rays filtered out or with a weight below the threshold can be hidden.

At block 1108, when an action occurs that is based on a ray (e.g., a user selection gesture is performed, an application requests the current direction of a ray, etc.) process 1100 can provide indications of the primary ray (e.g., access to the primary ray, the origin and direction of the primary ray, indications of object(s) the primary ray intersects, etc.) for carrying out the action. Process 1100 can repeat continuously as rays are used in the XR system.

Figure 12A:
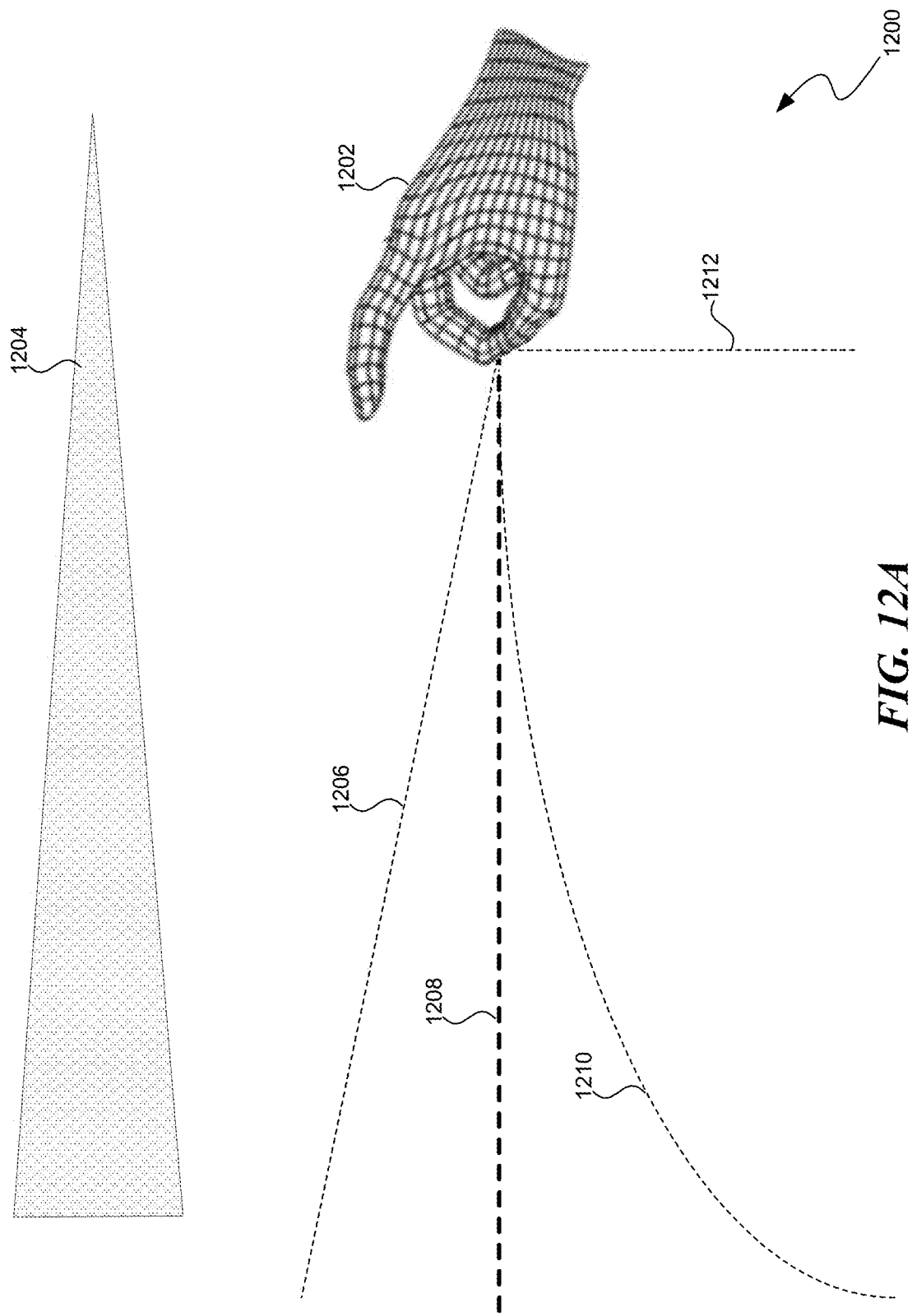
FIGS. 12A and 12B are conceptual diagrams illustrating an example of casting multiple rays, with one selected as a primary ray for user interactions.
Figure 12B:
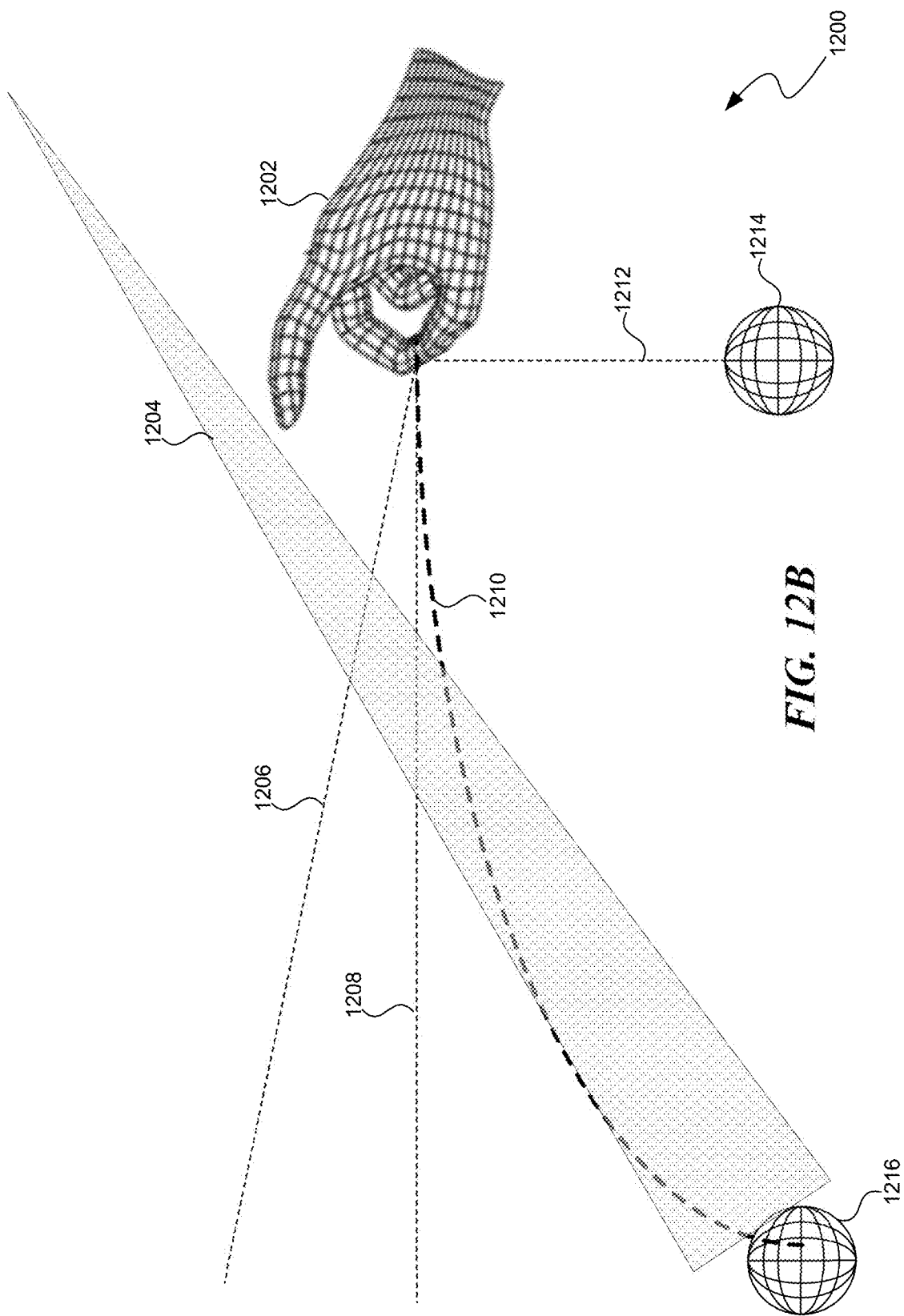

FIGS. 12A and 12B are conceptual diagrams illustrating an example 1200 of casting multiple rays, with one selected based on a hierarchy and user focus. Example 1200 shows a user hand 1202 with rays 1206-1212 being cast by an XR system from an origin where the user has brought together the tip of her thumb and middle finger. Example 1200 also shows an indication 1204 of the user's gaze tracked by the XR system.

In example 1200, a hierarchy of weights is applied to the rays 1206-1212 as follows: ray 1208—0.5, ray 1212—0.25, ray 1210—0.2, and ray 1206—0.1. In example 1200, ray weights are further based on whether the ray intersects with a selectable object (+0.4) and whether the user's gaze corresponds to a ray (+0.5).

In FIG. 12A, none of the rays intersect with a selectable object and the user's gaze does not correspond to any of the rays, thus the rays are weighted according to the hierarchy as: ray 1208—0.5, ray 1212—0.25, ray 1210—0.2, and ray 1206—0.1. Thus, in FIG. 12A, ray 1208 with the highest weight is the primary ray and is therefore displayed by the XR system with a bolder line than the other rays.

In FIG. 12B, in addition to the hierarchy ray weights, ray 1210 intersects with selectable object 1216 and ray 1212 intersects with selectable ray 1214. Thus, the weight for each of these rays is increased by 0.4. In addition, the user's gaze 1204 further intersects with selectable object 1216 at a point within a threshold distance of where ray 1210 intersects with selectable object 1216. Thus, the weight for ray 1210 is further increased by 0.5. Accordingly, the weights of the rays in FIG. 12B are as follows: ray 1210—1.1 (0.2+0.4+0.5), ray 1212—0.65 (0.25+0.4), ray 1208—0.5, and ray 1206—0.1. Thus, in FIG. 12B, ray 1210 with the highest weight is the primary ray and is therefore displayed by the XR system with a bolder line than the other rays.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for customizing ray casting rules in an artificial three-dimensional (3D) environment, the method comprising:
    providing the artificial 3D environment wherein at least one user-controlled ray is provided and is configured with a current set of ray casting rules that define properties of the at least one user-controlled ray;
    detecting a trigger event corresponding to an element of the artificial 3D environment, wherein the element of the artificial 3D environment is linked to one or more alternate sets of ray casting rules;
    wherein the element of the artificial 3D environment is a specified volume allocated in relation to an application, wherein the allocation of the specified volume includes the application assigning the one or more alternate sets of ray casting rules to the specified volume; and
    wherein the trigger event comprises determining that at least a part of the user entered the specified volume;
    retrieving an alternate set of ray casting rules from the one or more alternate sets of ray casting rules linked to the element of the artificial 3D environment; and
    applying the alternate set of ray casting rules such that a displayed ray has at least one property different from the properties of rays using the current set of ray casting rules.

2. The method of claim 1, wherein the at least one different property specifies a difference in size or shape for the displayed ray.

3. The method of claim 1, wherein the at least one different property specifies a difference in how the displayed ray interacts with elements in the artificial 3D environment.

4. The method of claim 1, wherein the at least one different property specifies a difference in an origin point for the displayed ray or how the displayed ray responds to user input.

5. The method of claim 1, wherein the alternate set of ray casting rules is linked to the element of the artificial 3D environment via an identifier assigned to a pre-defined ray casting rule set.

6. The method of claim 1, wherein the element of the artificial 3D environment was automatically linked to the alternate set of ray casting rules based on a type specified for the element of the artificial 3D environment and a mapping of element types to sets of ray casting rules.

7. The method of claim 1, wherein the element of the artificial 3D environment was automatically linked to the alternate set of ray casting rules by:
    determining a use-case by analyzing—
        uses of the element of the artificial 3D environment, or
        uses of elements identified as similar to the element of the artificial 3D environment; and
    identifying a match between the determined use-case and the alternate set of ray casting rules.

8. The method of claim 1,
    wherein the one or more alternate sets of ray casting rules include at least two sets of ray casting rules; and
    wherein the retrieved alternate set of ray casting rules is selected from the at least two sets of ray casting rules by determining a match between a context of the trigger event and the alternate set of ray casting rules.

9. The method of claim 1 further comprising, in response to the trigger event, causing display of one or more transition visual indicators, associated with the alternate set of ray casting rules, that illustrate a transition from the current set of ray casting rules to the alternate set of ray casting rules.

10. The method of claim 1 further comprising causing display of one or more affordances, in relation to the specified volume of the artificial 3D environment, that indicate the specified volume of the artificial 3D environment is associated with the one or more alternate sets of ray casting rules.

11. A method for customizing ray casting rules in an artificial three-dimensional (3D) environment, the method comprising:
    providing the artificial 3D environment wherein at least one user-controlled ray is provided and is configured with a current set of ray casting rules that define properties of the at least one user-controlled ray;

detecting a trigger event corresponding to an element of the artificial 3D environment, wherein the element of the artificial 3D environment is linked to one or more alternate sets of ray casting rules;

wherein the element of the artificial 3D environment is a specified virtual object; and wherein the trigger event comprises determining that the user selected the specified virtual object;

retrieving an alternate set of ray casting rules from the one or more alternate sets of ray casting rules linked to the element of the artificial 3D environment; and applying the alternate set of ray casting rules such that a displayed ray has at least one property different from the properties of rays using the current set of ray casting rules.

12. The method of claim 11 further comprising causing display of one or more affordances, in relation to the element of the artificial 3D environment, that indicate the element of the artificial 3D environment is associated with the one or more alternate sets of ray casting rules.

13. The method of claim 11, wherein the applying the alternate set of ray casting rules changes the displayed ray to be cast downward from a palm of the user.

14. The method of claim 11, wherein the specified virtual object of the artificial 3D environment was automatically linked to the alternate set of ray casting rules based on a type specified for the specified virtual object of the artificial 3D environment and a mapping of element types to sets of ray casting rules.

15. The method of claim 11, wherein the specified virtual object of the artificial 3D environment was automatically linked to the alternate set of ray casting rules by:

determining a use-case by analyzing—
uses of the specified virtual object of the artificial 3D environment, or
uses of elements identified as similar to the specified virtual object of the artificial 3D environment; and
identifying a match between the determined use-case and the alternate set of ray casting rules.

16. The method of claim 11 further comprising causing display of one or more affordances, in relation to the specified virtual object of the artificial 3D environment, that indicate the specified virtual object of the artificial 3D environment is associated with the one or more alternate sets of ray casting rules.

17. A computer-readable storage medium storing instructions that, when executed by a computing system, cause the computing system to perform operations comprising:

providing an artificial environment that employs at least one user-controlled ray with first properties defining aspects of the at least one user-controlled ray;

detecting a trigger event, wherein the trigger event corresponds to—
a specified volume allocated in relation to an application, wherein the allocation of the specified volume includes the application assigning one or more alternate sets of ray casting rules to the specified volume;

retrieving the alternate set of ray casting rules; and applying the alternate set of ray casting rules such that a displayed ray has at least one property different from the first properties.

18. The computer-readable storage medium of claim 17, wherein the at least one different property specifies one or more of:
a difference in shape for the displayed ray;
a difference in size for the displayed ray;
a difference in how the displayed ray interacts with elements in the artificial environment;
a difference in an origin point for the displayed ray;
how the displayed ray responds to user input; or
any combination thereof.

19. The computer-readable storage medium of claim 17, wherein the trigger event comprises determining that at least a hand of the user entered the specified volume.

\* \* \* \* \*